US012750849B2

(12) United States Patent
Wu et al.

(10) Patent No.: US 12,750,849 B2
(45) Date of Patent: Sep. 29, 2026

(54) SUPERPOSITION TRANSMISSION TO IMPROVE SYSTEM PERFORMANCE

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 18/057,203

(22) Filed: Nov. 18, 2022

(65) Prior Publication Data

US 2024/0172228 A1 May 23, 2024

(51) Int. Cl.
*H04W 72/1273* (2023.01)
*H04L 5/00* (2006.01)
*H04W 72/23* (2023.01)

(52) U.S. Cl.
CPC ....... *H04W 72/1273* (2013.01); *H04L 5/0094* (2013.01); *H04W 72/23* (2023.01)

(58) Field of Classification Search
CPC ............. H04W 72/1273; H04W 72/23; H04W 72/569; H04L 5/0094; H04L 5/0053; H04J 11/0036

(Continued)

(56) References Cited

U.S. PATENT DOCUMENTS

2009/0022234 A1* 1/2009 Wang .................. H04L 27/3488 375/316
2010/0202561 A1* 8/2010 Gorokhov ............... H04L 27/36 375/295

(Continued)

OTHER PUBLICATIONS

Huawei, et al., "Discussion on UL Multiplexing of Grant-based eMBB and URLLC", 3GPP TSG RAN WG1 Meeting #90, R1-1712207, 3rd Generation Partnership Project, Mobile Competence Centre, 650, Route Des Lucioles, F-06921 Sophia-Antipolis Cedex, France, vol. RAN WG1, No. Prague, Czech Republic, Aug. 21-Aug. 25, 2017, Aug. 20, 2017, 3 Pages, XP051315024.

(Continued)

*Primary Examiner* — Ricardo H Castaneyra
(74) *Attorney, Agent, or Firm* — Holland & Hart LLP

(57) ABSTRACT

Methods, systems, and devices for wireless communication are described. A network entity may transmit, to a first user equipment (UE), control signaling scheduling a first set of resources for a first transmission. The network entity may transmit, to the first UE, a second UE, or both, superposition control information indicating superposition of a second transmission with the first transmission during a portion of the first set of resources. In some examples, the network entity may superimpose the first transmission with the second transmission via an enhanced layer and base layer of the superposition signal. In some examples, the network entity may superimpose the first transmission with the second transmission based on bit allocation. In some examples, the network entity may superimpose the first transmission and second transmission via separate layers of the superposition signal. The network entity may transmit the superposition signal to the first UE and the second UE.

25 Claims, 16 Drawing Sheets

(58) Field of Classification Search
USPC .......... 370/329, 207, 395.42, 230, 229, 235, 370/254, 310, 390, 465, 469
See application file for complete search history.

(56) References Cited

U.S. PATENT DOCUMENTS

| | | | | |
|---|---|---|---|---|
| 2015/0139120 | A1* | 5/2015 | ElArabawy | H04L 27/3488 370/329 |
| 2015/0319021 | A1* | 11/2015 | Xue | H04W 24/08 455/511 |
| 2015/0326360 | A1 | 11/2015 | Malladi et al. | |
| 2016/0119096 | A1* | 4/2016 | Sun | H04W 76/27 370/329 |
| 2020/0389870 | A1* | 12/2020 | Shin | H04W 48/08 |

OTHER PUBLICATIONS

International Search Report and Written Opinion—PCT/US2023/077513—ISA/EPO—Feb. 15, 2024 (2207121WO).

* cited by examiner

SUPERPOSITION TRANSMISSION TO IMPROVE SYSTEM PERFORMANCE

FIELD OF TECHNOLOGY

The following relates to wireless communications, including superposition transmission to improve system performance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support superposition transmission to improve system performance. For example, the described techniques provide for a network entity to superimpose a first transmission for a first user equipment (UE) with a second transmission for a second UE in favor of preemption and cancellation. For example, a network entity may transmit, to the first UE, control signaling scheduling a first set of resources for a first transmission. The network entity may transmit, to the first UE, the second UE, or both, superposition control information indicating superposition of a second transmission with the first transmission during a portion of the first set of resources. In some examples, the network entity may superimpose the first transmission with the second transmission via an enhanced layer and base layer of the superposition signal. In some examples, the network entity may superimpose the first transmission with the second transmission based on bit allocation. In some examples, the network entity may superimpose the first transmission and second transmission via separate layers of the superposition signal. The network entity may transmit the superposition signal to the first UE and the second UE.

A method for wireless communication at a UE is described. The method may include receiving control signaling scheduling a first transmission via a first set of resources, receiving superposition control information that indicates superposition of a second transmission and the first transmission during at least a portion of the first set of resources based at least on part on the second transmission having a higher priority than the first transmission, monitoring the first set of resources for the first transmission based on the control signaling, and decoding a superposition signal including the first transmission and the second transmission to receive the first transmission via the first set of resources based on the superposition control information.

An apparatus for wireless communication at a UE is described. The apparatus may include a processor, memory coupled with the processor, and instructions stored in the memory. The instructions may be executable by the processor to cause the apparatus to receive control signaling scheduling a first transmission via a first set of resources, receive superposition control information that indicates superposition of a second transmission and the first transmission during at least a portion of the first set of resources based at least on part on the second transmission having a higher priority than the first transmission, monitor the first set of resources for the first transmission based on the control signaling, and decode a superposition signal including the first transmission and the second transmission to receive the first transmission via the first set of resources based on the superposition control information.

Another apparatus for wireless communication at a UE is described. The apparatus may include means for receiving control signaling scheduling a first transmission via a first set of resources, means for receiving superposition control information that indicates superposition of a second transmission and the first transmission during at least a portion of the first set of resources based at least on part on the second transmission having a higher priority than the first transmission, means for monitoring the first set of resources for the first transmission based on the control signaling, and means for decoding a superposition signal including the first transmission and the second transmission to receive the first transmission via the first set of resources based on the superposition control information.

A non-transitory computer-readable medium storing code for wireless communication at a UE is described. The code may include instructions executable by a processor to receive control signaling scheduling a first transmission via a first set of resources, receive superposition control information that indicates superposition of a second transmission and the first transmission during at least a portion of the first set of resources based at least on part on the second transmission having a higher priority than the first transmission, monitor the first set of resources for the first transmission based on the control signaling, and decode a superposition signal including the first transmission and the second transmission to receive the first transmission via the first set of resources based on the superposition control information.

Some examples of the method, apparatuses, and non-transitory computer-readable medium described herein may further include operations, features, means, or instructions for receiving, in the superposition control information, an indication of whether the first transmission may be to be transmitted via an enhanced layer of the superposition signal or a base layer of the superposition signal, where receiving the first transmission may be based on the indication.

Some examples of the method, apparatuses, and non-transitory computer-readable medium described herein may further include operations, features, means, or instructions for receiving, in the superposition control information, an indication that a first portion of the superposition signal may be allocated for the first transmission and a second portion of the superposition signal may be allocated for the second transmission, where receiving the first transmission may be based on receiving the indication.

In some examples of the method, apparatuses, and non-transitory computer-readable medium described herein, the first portion corresponds to a set of least significant bits of the superposition signal and the second portion corresponds to a set of most significant bits of the superposition signal.

In some examples of the method, apparatuses, and non-transitory computer-readable medium described herein, the first portion corresponds to a set of most significant bits of the superposition signal and the second portion corresponds to a set of least significant bits of the superposition signal.

In some examples of the method, apparatuses, and non-transitory computer-readable medium described herein, receiving the first transmission may include operations, features, means, or instructions for decoding an enhanced layer of the superposition signal including the enhanced layer and a base layer, the base layer associated with the second transmission.

In some examples of the method, apparatuses, and non-transitory computer-readable medium described herein, receiving the first transmission may include operations, features, means, or instructions for decoding a base layer of the superposition signal including an enhanced layer and the base layer, the enhanced layer associated with the second transmission.

In some examples of the method, apparatuses, and non-transitory computer-readable medium described herein, receiving the first transmission may include operations, features, means, or instructions for decoding the superposition signal to obtain the first transmission from a base layer of the superposition signal based on the second transmission having the higher priority than the first transmission.

Some examples of the method, apparatuses, and non-transitory computer-readable medium described herein may further include operations, features, means, or instructions for receiving, in the superposition control information, an indication that the first transmission corresponds to a first transmission layer of the superposition signal and the second transmission corresponds to a second transmission layer of the superposition signal, the superposition control information indicating one or more parameters associated with the second transmission layer, where decoding the superposition signal includes and decoding the superposition signal to obtain the first transmission from the first transmission layer of the superposition signal based on one or more parameters associated with the second transmission layer.

In some examples of the method, apparatuses, and non-transitory computer-readable medium described herein, the superposition control information indicates a time and frequency location of the superposition signal, a power parameter associated with the superposition signal, a modulation and coding scheme associated with the superposition signal, a channel identifier associated with the superposition signal, a demodulation reference signal identifier, or a combination thereof.

Some examples of the method, apparatuses, and non-transitory computer-readable medium described herein may further include operations, features, means, or instructions for transmitting, to a network entity, a capability message indicating a capability to decode an enhanced layer of the superposition signal, where receiving the superposition control information that indicates the superposition of the second transmission may be based on the capability message.

A method for wireless communications at a network entity is described. The method may include transmitting, to a first UE, control signaling scheduling a first transmission via a first set of resources, transmitting, to the first UE, a second UE, or both, superposition control information that indicates superposition of a second transmission and the first transmission during at least a portion of the first set of resources based at least on part on the second transmission having a higher priority than the first transmission, and transmitting, to the first UE, the second UE, or both, a superposition signal via a second set of resources that at least partially overlap with the first set of resources, the superposition signal including at least a portion of the first transmission and the second transmission.

An apparatus for wireless communications at a network entity is described. The apparatus may include a processor, memory coupled with the processor, and instructions stored in the memory. The instructions may be executable by the processor to cause the apparatus to transmit, to a first UE, control signaling scheduling a first transmission via a first set of resources, transmit, to the first UE, a second UE, or both, superposition control information that indicates superposition of a second transmission and the first transmission during at least a portion of the first set of resources based at least on part on the second transmission having a higher priority than the first transmission, and transmit, to the first UE, the second UE, or both, a superposition signal via a second set of resources that at least partially overlap with the first set of resources, the superposition signal including at least a portion of the first transmission and the second transmission.

Another apparatus for wireless communications at a network entity is described. The apparatus may include means for transmitting, to a first UE, control signaling scheduling a first transmission via a first set of resources, means for transmitting, to the first UE, a second UE, or both, superposition control information that indicates superposition of a second transmission and the first transmission during at least a portion of the first set of resources based at least on part on the second transmission having a higher priority than the first transmission, and means for transmitting, to the first UE, the second UE, or both, a superposition signal via a second set of resources that at least partially overlap with the first set of resources, the superposition signal including at least a portion of the first transmission and the second transmission.

A non-transitory computer-readable medium storing code for wireless communications at a network entity is described. The code may include instructions executable by a processor to transmit, to a first UE, control signaling scheduling a first transmission via a first set of resources, transmit, to the first UE, a second UE, or both, superposition control information that indicates superposition of a second transmission and the first transmission during at least a portion of the first set of resources based at least on part on the second transmission having a higher priority than the first transmission, and transmit, to the first UE, the second UE, or both, a superposition signal via a second set of resources that at least partially overlap with the first set of resources, the superposition signal including at least a portion of the first transmission and the second transmission.

In some examples of the method, apparatuses, and non-transitory computer-readable medium described herein, transmitting the superposition signal may include operations, features, means, or instructions for transmitting the second transmission via a base layer of the superposition signal and transmitting the first transmission via an enhanced layer of the superposition signal.

In some examples of the method, apparatuses, and non-transitory computer-readable medium described herein, transmitting the superposition signal may include operations, features, means, or instructions for transmitting the second transmission via an enhanced layer of the superposition signal and transmitting the first transmission via a base layer of the superposition signal.

In some examples of the method, apparatuses, and non-transitory computer-readable medium described herein, the superposition control information indicates a time and frequency location of the superposition signal, a base layer or an enhanced layer associated with first transmission, a power parameter associated with the superposition signal, a modulation and coding scheme associated with the superposition signal, a channel identifier associated with the superposition signal, a demodulation reference signal identifier associated with the superposition signal, or a combination thereof.

In some examples of the method, apparatuses, and non-transitory computer-readable medium described herein, transmitting the superposition signal may include operations, features, means, or instructions for transmitting the superposition signal in accordance with a first modulation and coding scheme for the first transmission and a second modulation and coding scheme for the second transmission.

Some examples of the method, apparatuses, and non-transitory computer-readable medium described herein may further include operations, features, means, or instructions for transmitting the superposition control information including an indication of the first modulation and coding scheme, the second modulation and coding scheme, or both.

In some examples of the method, apparatuses, and non-transitory computer-readable medium described herein, transmitting the superposition signal may include operations, features, means, or instructions for transmitting the superposition signal including the first transmission as one of a base layer or an enhanced layer based on one or more parameters associated with the first UE and the second transmission as one of the base layer or the enhanced layer based on one or more parameters associated with the second UE.

Some examples of the method, apparatuses, and non-transitory computer-readable medium described herein may further include operations, features, means, or instructions for transmitting the superposition control information that includes an indication of the base layer and the enhanced layer.

In some examples of the method, apparatuses, and non-transitory computer-readable medium described herein, the one or more parameters include a priority level, a pathloss, a channel quality, a device capability, or any combination thereof.

Some examples of the method, apparatuses, and non-transitory computer-readable medium described herein may further include operations, features, means, or instructions for transmitting the superposition control information that includes an indication that a first portion of the superposition signal may be allocated for the first transmission and a second portion of the superposition signal may be allocated for the second transmission.

Some examples of the method, apparatuses, and non-transitory computer-readable medium described herein may further include operations, features, means, or instructions for mapping the first transmission to a set of multiple least significant bits of the superposition signal and mapping the second transmission to a set of multiple most significant bits of the superposition signal, where transmitting the superposition signal may be based on the mapping.

Some examples of the method, apparatuses, and non-transitory computer-readable medium described herein may further include operations, features, means, or instructions for mapping the first transmission to a set of multiple most significant bits of the superposition signal and mapping the second transmission to a set of multiple least significant bits of the superposition signal, where transmitting the superposition signal may be based on the mapping.

In some examples of the method, apparatuses, and non-transitory computer-readable medium described herein, transmitting the superposition signal may include operations, features, means, or instructions for transmitting a first transmission layer of the superposition signal that includes the first transmission via and transmitting a second transmission layer of the superposition signal that includes the second transmission.

Some examples of the method, apparatuses, and non-transitory computer-readable medium described herein may further include operations, features, means, or instructions for transmitting the superposition control information that includes an indication that the first transmission corresponds to the first transmission layer and the second transmission corresponds to the second transmission layer, the superposition control information indicating one or more parameters associated with the first transmission layer, the second transmission layer, or both.

Some examples of the method, apparatuses, and non-transitory computer-readable medium described herein may further include operations, features, means, or instructions for receiving a capability message indicating a capability to decode an enhanced layer of the superposition signal, where transmitting the superposition signal may be based on the capability message.

DETAILED DESCRIPTION

Figure 1:
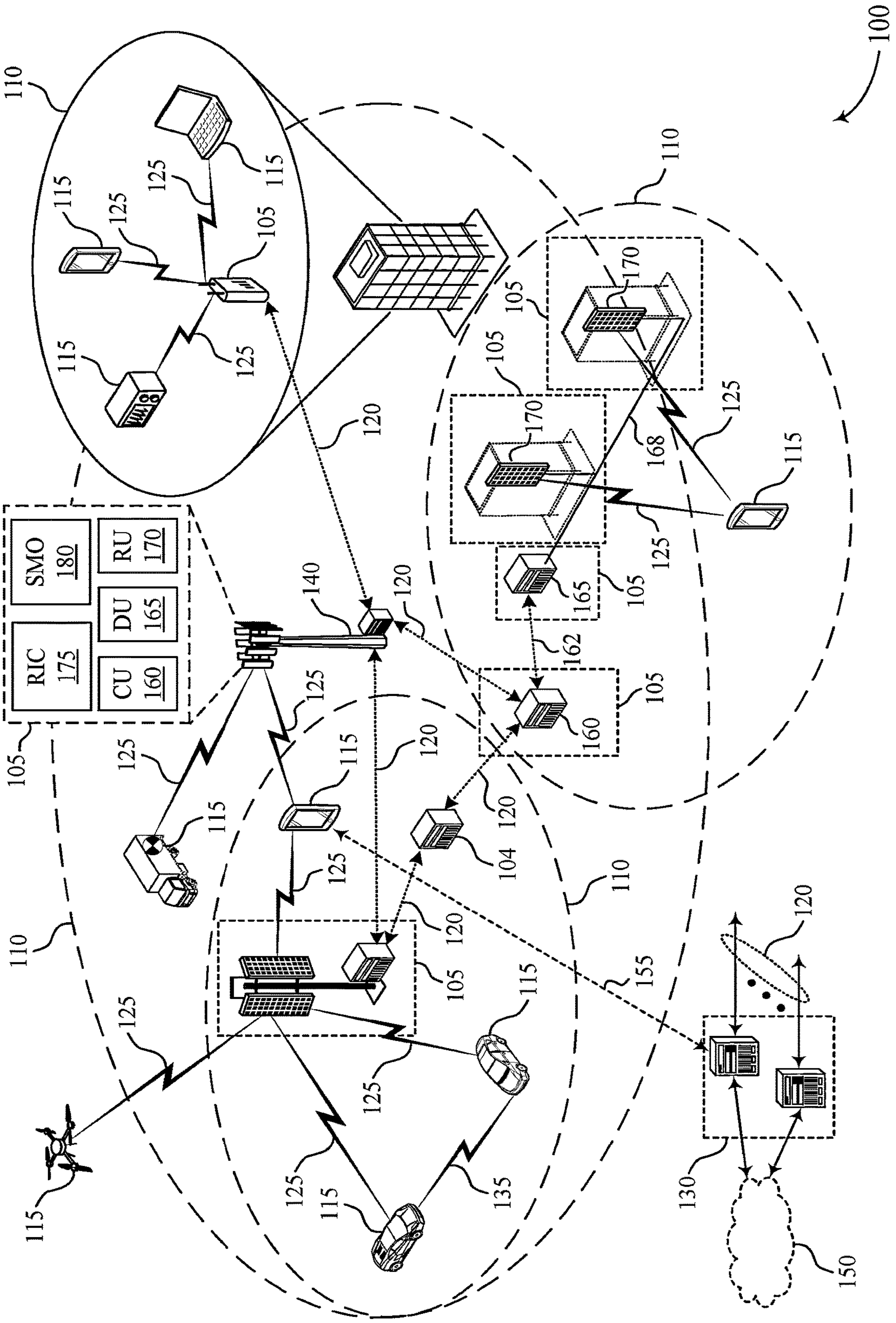
FIG. 1 illustrates an example of a wireless communications system that supports superposition transmission to improve system performance in accordance with one or more aspects of the present disclosure.

In some wireless communications systems, a network entity may communicate ultra-reliable low latency communication (URLLC) traffic to one or more user equipments (UEs). In such systems, to meet the transmission constraints for URLLC traffic, the network entity may preempt or cancel a lower priority transmission (e.g., such as an enhanced Mobile Broadband (eMBB) transmissions) in favor of the URLLC transmission. For example, the network entity may schedule one or more resources for a lower priority transmission for a first UE. In such examples, the network entity may also have a URLLC transmission for a second UE. As such, the network entity may preempt or cancel the lower priority transmission to transmit the URLLC transmission in cases when there is not a sufficient amount of resources available to schedule both the URLLC transmission and lower priority transmission. However, preemption and cancellation of the lower priority transmissions may cause a portion or the entirety of the lower priority transmissions to be discarded, thereby decreasing throughput, increasing latency, and degrading user experience in the wireless communications system.

The techniques described herein may enable the network entity to superimpose a URLLC transmission with the lower priority transmission on scheduled resources in favor of preempting or cancelling the lower priority transmission, thereby reducing latency in the wireless communications system. For example, the network entity may transmit signaling to a first UE scheduling resources for a first transmission (e.g., eMBB transmission). Additionally, the network entity may have a second transmission (e.g., URLLC transmission) to be sent to a second UE. In such examples, the network entity may determine to superimpose the second transmission with the first transmission on overlapping resources and transmit the superposition signal to the first UE and the second UE.

In some examples, the network entity may transmit the second transmission on a base layer of the superposition signal and the first transmission on an enhanced layer of the superposition signal. For example, the network entity may encode the first transmission and the second transmission into a superposition signal that includes a base layer and an enhanced layer. The base layer may be decodable independent of the enhanced layer. The enhanced layer may be decoded by cancelling the base layer from the enhanced layer. In such examples, the network entity may transmit superposition control information to the first UE indicating one or more parameters that may be used to decode the enhanced layer. In some other examples, the network entity may transmit the first transmission via the base layer of the superposition signal and the second transmission via the enhanced layer of the superposition signal. In such examples, the network entity may transmit the superposition control information to the second UE, such that the second UE may decode the enhanced layer of the superposition signal to receive the second transmission. In some examples, the network entity may dynamically or semi-statically determine which transmission (e.g., the first transmission or the second transmission) is to be transmitted via the base layer of the superposition signal. In such examples, the network entity may indicate, via the superposition control information, the determination.

In some examples, the network entity may dynamically or semi-statically determine which transmission (e.g., the first transmission or the second transmission) is to be transmitted via the base layer of the superposition signal. In such examples, the network entity may indicate, via the superposition control information, the determination (e.g., to one or both of the two receiving UEs). In some examples, the network entity may transmit the superposition signal according to a bit allocation. For example, the network entity may transmit the first transmission via one or more most significant bits of the superposition signal, while the second transmission may be transmitted via the least significant bits of the superposition signal, or vice versa. In such examples, the network entity may indicate, via the superposition control information, the bit allocation to the first UE, the second UE, or both. In some other examples, the network entity may transmit the first transmission and the second transmission on separate multiple input multiple output (MIMO) layers of the superposition signal. In such examples, the network entity may transmit the superposition control information to indicate one or more parameters, such that each UE may be able to decode the superposition signal and receive the respective transmissions. In this way, the network entity may transmit both the first transmission and the second transmission to the respective UEs, thereby reducing latency due to preemption and cancellation in the wireless communications system.

Aspects of the disclosure are initially described in the context of wireless communications systems. Aspects of the disclosure are further illustrated in the context of a superposition scheme and process flow. Aspects of the disclosure are further illustrated by and described with reference to apparatus diagrams, system diagrams, and flowcharts that relate to superposition transmission to improve system performance.

FIG. 1 illustrates an example of a wireless communications system 100 that supports superposition transmission to improve system performance in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support superposition transmission to improve system performance as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened Totes (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The wireless communications system 100 may be configured to support ultra-reliable communications or low-latency communications, or various combinations thereof. For example, the wireless communications system 100 may be configured to support URLLC. The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases of the wireless communications system 100, the network entity 105 may utilize preemption and cancellation mechanisms for URLLC transmissions over a channel (e.g., such as a Uu interface). For example, URLLC traffic may be less tolerant to latency and have higher reliability constraints relative to lower priority transmissions (e.g., such as eMBB transmissions). In order to meet URLLC traffic constraints, the network entity may schedule the URLLC transmission in a relatively timely manner (e.g., relative to when the URLLC transmission is to be sent). As such, the wireless communications system 100 (e.g., an NR system) may utilize preemption and cancellation for prompt scheduling of URLLC traffic when there are not a sufficient amount of resources available for the URLLC transmission and one or more lower priority transmissions.

For example, the network entity 105 may preempt one or more lower priority transmissions in a downlink when the network entity 105 has a URLLC transmission to schedule over previously allocated resource (e.g., for an eMBB transmission). In such examples, the network entity 105 may schedule resources that overlap with the previously schedule resources (e.g., puncture the previously schedule resources) and schedule a URLLC transmission in the overlapping resources. Additionally, the network entity 105 may transmit a preemption indication (PI) (e.g., via downlink control information (DCI) using format 2_1 that is scrambled with a radio network temporary identifier (RNTI)) to indicate to the UE 115 associated with the lower priority transmission that such transmission has been preempted. Based on receiving the PI, the UE 115 may remove the bits received from the overlapping resources (e.g., flush the buffer for bits received in the preempted resource).

In the case of uplink transmissions, the network entity 105 may allocate, for a first UE 115, resources for URLLC transmission in overlapping portions of a resource that has already been allocated for another transmission at a second UE 115 (e.g., eMBB) based on receiving a scheduling request for a URLLC transmission from the first UE 115. As such, the network entity may transmit a cancellation indication (CI) to the second UE 115 (e.g., via a DCI using format 2_4 that is scrambled by a RNTI) indicating the cancellation of the transmission (e.g., eMBB transmission). However, preemption and cancellation of the lower priority transmissions may cause a portion or the entirety of the lower priority transmissions to be discarded, thereby decreasing throughput, increasing latency, and degrading user experience in the wireless communications system.

In some examples of the wireless communications system 100, the network entity 105 may support superposition transmissions (e.g., overlapping transmissions involving multiple transmitters, receivers, or both). For example, the network entity 105 may transmit to two UEs 115 using the same resource (e.g., which may be referred to as multi-user superposition transmission (MUST)). In such examples, the network entity 105 may communicate with a first UE 115 and a second UE 115, where the first UE 115 may be a physically located further away from the network entity 105 (e.g., near the edge of the serving cell) as compared to the second UE 115 (e.g., first UE 115 is farther and the second UE 115 is closer to the network entity 105). As such, to perform the superposition transmission, the network entity may allocate a higher transmission power and lower spectral efficiency for the first UE 115 (e.g., the further UE) and a smaller transmission power and higher spectral efficiency for the second UE 115 (e.g., the closer UE). In one illustrative example, the network entity may perform adaptive power allocation and perform non-Gray mapping (e.g., $QAM_1+QAM_2$) modulation scheme for the superposition signal for the superposition signal. In another example, the network entity may perform adaptive power allocation and use a Gray mapping (e.g., $QAM_1+e^{j\Phi}\cdot QAM_2$) modulation scheme. In some other examples, the network entity may perform a non-adaptive power allocation and utilize a bit allocation modulation scheme for the superposition signal.

The techniques described herein may enable the network entity 105 to superimpose a URLLC transmission with the lower priority transmission on scheduled resources in favor of preempting or cancelling the lower priority transmission, thereby reducing latency in the wireless communications system. For example, the network entity 105 may transmit signaling to a first UE 115 scheduling resources for a first transmission (e.g., eMBB transmission). Additionally, the network entity may have a second transmission (e.g., URLLC transmission) to be sent to a second UE 115. In such examples, the network entity 105 may determine to superimpose the second transmission with the first transmission on overlapping resources and transmit the superposition signal to the first UE 115 and the second UE 115.

In some examples, the network entity 105 may transmit the second transmission on a base layer of the superposition signal and the first transmission on an enhanced layer of the super imposed signal. In such examples, the network entity 105 may transmit superposition control information to the first UE 115 indicating one or more parameters that may be used to decode the enhanced layer. In some other examples, the network entity 105 may transmit the first transmission via the base layer of the superposition signal and the second transmission via the enhanced layer of the superposition signal. In such examples, the network entity 105 may transmit the superposition control information to the second UE 115, such that the second UE 115 may decode the enhanced layer of the superposition signal to receive the second transmission.

In some examples, the network entity 105 may dynamically or semi-statically determine which transmission (e.g., the first transmission or the second transmission) is to be transmitted via the base layer of the superposition signal. In such examples, the network entity 105 may indicate, via the superposition control information, to the first UE 115, the second UE 115, or both the determination and one or more parameters to enable the decoding of the enhanced layer. In some examples, the network entity 105 may transmit the superposition signal based on a bit allocation. For example, the network entity 105 may transmit the first transmission on one or more most significant bits of the superposition signal, while the second transmission may be transmitted via the least significant bits of the superposition signal, or vice versa. In such examples, the network entity 105 may indicate, via the superposition control information, the bit allocation to the first UE 115 and the second UE 115. In some other examples, the network entity 105 may transmit the first transmission and the second transmission on separate MIMO layers of the superposition signal. In such examples, the network entity 105 may transmit the superposition control information to indicate one or more parameters, such that each UE 115 to be able to decode the superposition signal and receive the respective transmissions. In this way, the network entity 105 may transmit both the first transmission and the second transmission to the respective UEs 115, thereby reducing latency due to preemption and cancellation in the wireless communications system.

Figure 2:
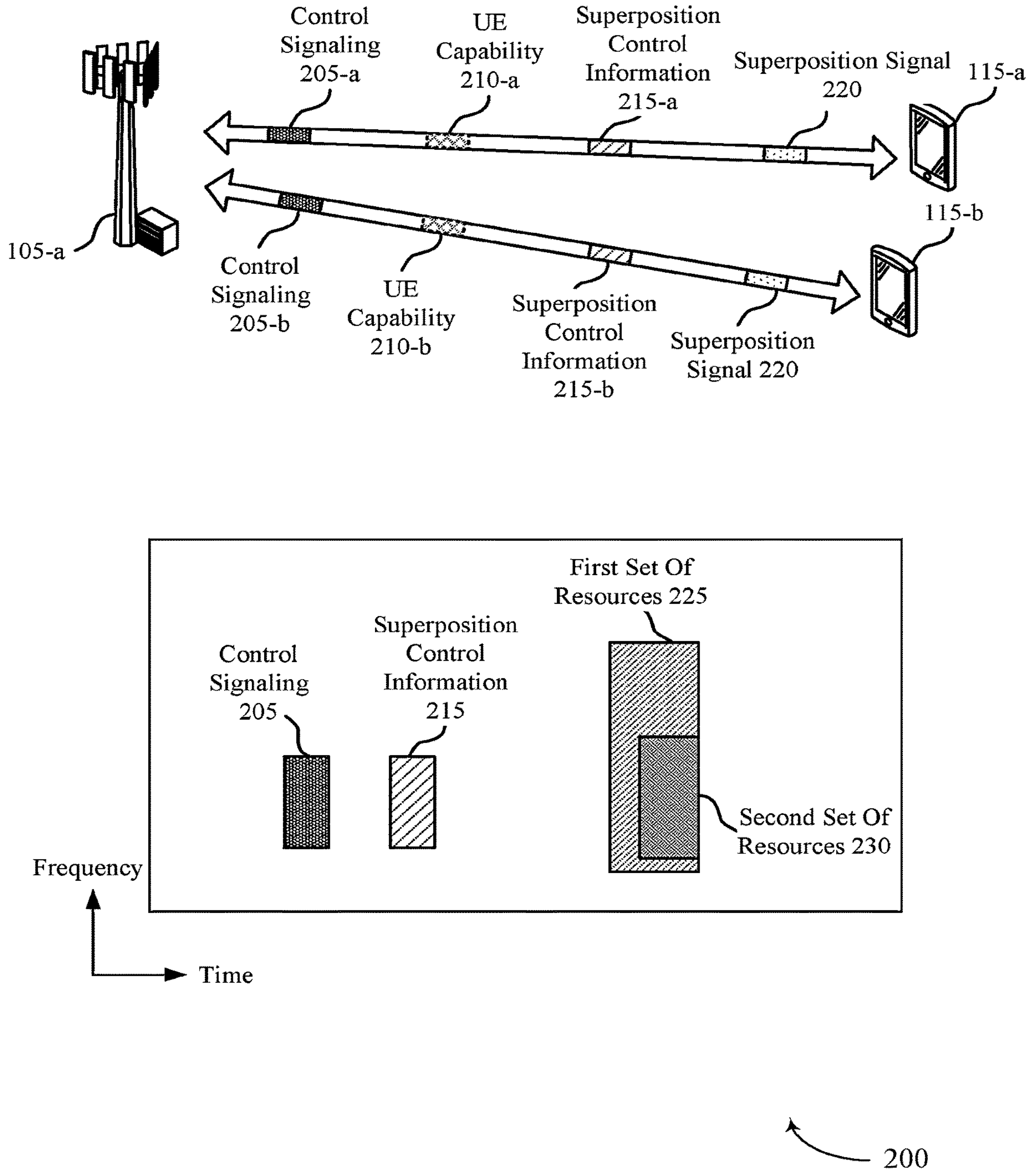
FIG. 2 illustrates an example of a wireless communications system that supports superposition transmission to improve system performance in accordance with one or more aspects of the present disclosure.

FIG. 2 illustrates an example of a wireless communications system 200 that supports superposition transmission to improve system performance in accordance with one or more aspects of the present disclosure. The wireless communications system 200 may implement or be implemented by aspects of wireless communications system 100 with reference to FIG. 1. For example, the wireless communications system 200 may include a network entity 105-*a*, a UE 115-*a*, and a UE 115-*b*, which may be examples of corresponding devices described herein with reference to FIG. 1.

In some cases of the wireless communications system 200, the network entity 105-*a* may communicate one or more high priority (e.g., URLLC) transmissions with one or more UEs 115 (e.g., the UE 115-*a* and the UE 115-*b*). To meet the constraints of URLLC transmissions (e.g., low latency and prompt scheduling), the network entity 105-*a* may preempt or cancel a scheduled transmission (e.g., an eMBB transmission) for the UE 115-*a* in favor of a higher priority (e.g., URLLC) transmission for the UE 115-*b*. For example, the network entity 105-*a* may schedule one or more resources (e.g., first set of resources 225) for a first transmission (e.g., such as a lower priority transmission or eMBB transmission) for the UE 115-*a*. In such cases, the network entity 105-*a* may also schedule a second transmission (e.g., such as a higher priority packet or URLLC transmission) for the UE 115-*b* (e.g., may schedule a second set of resources 230 for the second transmission). As such, the network entity 105-*a* may preempt or cancel the first transmission in order to schedule and transmit the second transmission (e.g., via the second set of resources 230, which at least partially overlap with the first set of resources 225) in cases when there is not a sufficient amount of resources available to schedule both first and second transmissions. In such cases, however, preemption and cancellation of the lower priority transmissions (e.g., via the first set of resources 225) may cause a portion or the entirety of the lower priority transmissions to be discarded, thereby decreasing throughput to the UE 115-*a*, increasing latency between the UE 115-*a* and the network entity 105-*a*, and degrading user experience at the UE 115-*a*.

The techniques described herein may enable the network entity 105-*a* to schedule a superposition signal 220 (e.g., superposition transmission) in favor of preempting or cancelling the first transmission (e.g., the lower priority transmission). In this way, the network entity 105-*a* may be able to transmit the superposition signal 220 that includes the first transmission (e.g., lower priority eMBB traffic) via the first set of resources 225, while also transmitting the second transmission (e.g., the higher priority URLLC traffic) in overlapping resources (e.g., the second set of resources 230) without preempting the already scheduled transmission. The two transmissions (e.g., eMBB and URLLC) may be superimposed based on one or more techniques described herein.

In some examples, the network entity 105-*a* may transmit the second transmission via a base layer of the superposition signal 220 (e.g., by default or as indicated in one or more standards documents), while transmitting the first transmission via an enhanced layer of the superposition signal 220. In some examples, the network entity 105-*a* may transmit the first transmission via the base layer of the superposition signal 220 (e.g., by default or as indicated in one or more standards documents), while transmitting the second transmission via the enhanced layer of the superposition signal 220. In some examples, the network entity 105-*a* may determine which transmission (e.g., eMBB or URLLC transmissions) to be the base layer of the superposition signal 220 and may dynamically or semi-statically indicate the determination to the UE 115-*a*, the UE 115-*b*, or both (e.g., via DCI, MAC CE, RRC signaling, or the like). Such techniques and signaling (e.g., transmitting the first and second transmissions via the enhanced and base layers) may be further described herein with reference to FIG. 2.

In some examples, the network entity 105-*a* may utilize bit allocation based on a MUST scheme for the superposition signal 220. In such examples, the network entity 105-*a* may map the first transmission to the least significant bits of the modulation constellation and map the second transmission to the most significant bits of the modulation constellation, or vice versa. Such techniques and signaling may be further described herein with reference to FIG. 3. In some other examples, the network entity may determine to refrain from using a composite constellation (e.g., bit allocation or base layer and enhanced layer superposition). That is, the two transmissions may be transmitted in overlapping resources, similar to MU-MIMO. In such cases, UEs 115 may be aware of transmission parameters of interfering layer for interference cancellation. For example, the network entity 105-*a* may transmit the first transmission and the second transmissions in separate spatial layers (e.g., MIMO layers) in one or more overlapping resources. In such cases, the UEs 115 may receive one or more transmission parameters to perform interference cancellation of the MIMO layers. Such techniques and signaling may be described herein with reference to FIG. 4. Depending on the technique used by the network entity 105-*a*, the network entity 105-*a* may or may not signal the superposition control information 215 to intended recipient of the first transmission or the second transmission.

In some implementations of the wireless communications system 200, the network entity 105-*a* may transmit the first transmission and the second transmission via the base layer and the enhanced layer of the superposition signal 220 to the UEs 115 in favor of preemption or cancellation. For example, the network entity 105-*a* may transmit control signaling 205-*a* to the UE 115-*a* scheduling a first set of resources for a first transmission (e.g., eMBB transmission). In such examples, the network entity 105-*a* may schedule a second transmission (e.g., URLLC transmission) for the UE 115-*b* (e.g., via at least a portion of the first set of resources). Rather than preempting the first transmission in favor of the second transmission, the network entity 105-*a* may determine to transmit the first transmission and the second transmission via the base layer and the enhanced layer of the superposition signal 220. As such, the network entity 105-*a* may transmit control signaling 205-*b* to the UE 115-*b* indicating a second set of resources to receive the second transmission, where the second set of resources may at least partially overlap with the first set of resources, and may transmit the superposition signal 220 via the overlapping resources.

The network entity 105-*a* may determine to transmit the first transmission and the second transmission via the base layer and the enhanced layer based on the capabilities of the UEs 115. For example, the UE 115-*a* may transmit a UE capability message 210-*a* indicating a capability to perform interference cancellation and decode the enhanced layer of the superposition signal. Likewise, in some examples, the UE 115-*b* may transmit a UE capability message 210-*b* indicating such a capability.

In one implementation, the network entity 105-*a* may transmit the second transmission (e.g., URLLC transmission) via the base layer of the superposition signal 220 (e.g., by default or as defined in a standard) and may transmit the first transmission via the enhanced layer of the superposition signal 220. In such examples, the network entity 105-*a* may map the bits of the second transmission to the most significant bit locations in the modulation constellation of the base layer (e.g., of the composite constellation). Further, in such examples, the network entity 105-*a* may transmit superposition control information 215-*a* to the UE 115-*a* indicating that the first transmission is transmitted via the enhanced layer of the superposition signal 220. The network entity 105-*a* may include, in the superposition control information 215-*a*, one or more decoding parameters, such that the UE 115-*a* may decode the enhanced layer of the superposition signal and receive the first transmission.

For example, to receive the enhanced layer of the superposition signal, the UE 115-*a* may perform interference cancellation to remove the base layer of the superposition signal 220. That is, based on receiving the superposition signal 220, the UE 115-*a* may decode, reconstruct, and cancel the base layer (e.g., second transmission) from the superposition signal 220 in order to decode the first transmission from the enhanced layer. To do such interference cancellation, the network entity 105-*a* may transmit, to the UE 115-*a*, the superposition control information 215-*a* to indicate the time and frequency location of the superposition signal 220, a power scaling factor of the superposition signal 220, a modulation order of the second transmission, a modulation and coding scheme (MCS) of the second transmission, a scrambling identifier (ID) for the data channel of the second transmission, a scrambling ID for a demodulation reference signal (DMRS) associated with the second transmission, or a combination thereof.

Further, because the second transmission is transmitted via the base layer of the superposition signal 220, the network entity 105-*b* may refrain from transmitting superposition control information 215-*b* to the UE 115-*b* (e.g., because the UE 115-*b* may not be aware of the transmission in the enhanced layer). That is, because the UE 115-*b* receives the second transmission via the base layer of the superposition signal, the UE 115-*b* may decode the base layer of the superposition signal 220 without performing interference cancellation via the enhanced layer.

The network entity 105-*a* may transmit the second transmission via the base layer of the superposition signal 220 due to the base layer having a relatively higher reliability (e.g., higher reliability than the enhanced layer), such that the second transmission (e.g., higher priority URLLC traffic) may be more likely to be received by the UE 115-*b*. Moreover, because decoding the base layer may not involve interference cancellation of the enhanced layer, the network entity 105-*a* may transmit the second transmission via the base layer, such that the UE 115-*b* may decode the second transmission (e.g., higher priority traffic) without incurring extra processing complexity or delay due to interference cancellation (e.g., decoded more promptly).

To transmit the first transmission via the enhanced layer, the network entity 105-*a* may use the MCS implemented for the base layer for the enhanced layer. For example, the network entity 105-*a* may use a non-Gray mapping modulation scheme for the base layer and the enhanced layer, such that the UE 115-*a* may refrain from reprocessing a portion of the first transmission during interference cancellation (e.g., no re-interleaving). In some other examples, the network entity 105-*a* may modify the MCSs between enhanced layer and the base layer, such that the network entity 105-*a* may use Gray mapping for the enhanced layer (e.g., and non-Gray mapping for the base layer). In some other examples, the network entity 105-*a* may use a lower modulation order for the enhanced layer as compared to the base layer.

In some examples, the network entity 105-*a* may include, in the superposition control information 215-*a* to the UE 115-*a*, which MCS may be used for the enhanced layer of the superposition signal 220. For instance, the network entity 105-*a* may determine whether to use Gray mapping or non-Gray mapping, whether to lower modulation order of the enhanced layer, or both and indicate the determination to the UE 115-*a* (e.g., via RRC signaling or indicated via the superposition control information 215-*a*, in e.g., DCI or a MAC CE), such that the UE 115-*a* may process the superposition signal 220 correctly (e.g., determine transport block size and demodulation correctly).

In some examples, the network entity 105-*a* may indicate the superposition control information 215-*a* to the UE 115-*a* after the superposition signal 220 is transmitted. In such examples, the UE 115-*a* may re-process the superposition signal 220 (e.g., superimposed portion or enhanced layer) to receive the first transmission. In some examples, the network entity 105-*a* may transmit the superposition control information 215-*a* to the UE 115-*a* prior to the transmission of the superposition signal 220, such that the UE 115-*a* may process the superposition signal 220 as indicated.

In some examples, the network entity 105-*a* may transmit the second transmission via the enhanced layer of the superposition signal 220 (e.g., by default or as defined in a standard) and transmit the first transmission via the base layer of the superposition signal 220. In such implementations, the network entity 105-*a* may transmit superposition control information 215-*b* to the UE 115-*b* due to the UE 115-*b* receiving the second transmission via the enhanced layer of the superposition signal 220. As such, the network entity 105-*a* may refrain from indicating the superposition control information 215-*a* to the UE 115-*a* due to the UE 115-*a* receiving the first transmission via the base layer of superposition signal 220. In this way, the UE 115-*a* may experience a transparent operation (e.g., may receive the first transmission as originally intended via a portion of the first resources).

The network entity 105-*a* may transmit the second transmission via the enhanced layer and the first transmission via the base layer of the superposition signal in cases when the network entity 105-*a* may decide to superimpose the second transmission after the first transmission has been scheduled and when the second transmission may not be a higher priority transmission (e.g., URLLC traffic). For example, the network entity 105-*a* may schedule, via control signaling 205-*a*, the first transmission (e.g., eMBB transmission). The network entity 105-*a* may also schedule the second transmission for the UE 115-*b*, where the priority for the second transmission is less than or equal to the priority of the first transmission (e.g., another eMBB transmission). In some examples, the network entity 105-*a* may determine to superimpose the first transmission with the second transmission, where the first transmission may be transmitted via the base layer of the superposition signal 220 and the second transmission may be transmitted via the enhanced layer of the superposition signal 220 based on the priority of the second transmission being less than or equal to the priority of the first transmission. In such implementations the UE 115-*b* may decode, reconstruct, and cancel the base layer (e.g., perform interference cancellation to remove the base layer from the superposition signal) and decode the enhanced layer from the superposition signal after cancellation to receive the second transmission.

In some implementations, the network entity 105-*a* may dynamically determine which transmission (e.g., first and second transmission) to transmit via the base layer of the superposition signal 220. The network entity 105-*a* may dynamically determine which transmission to transmit via the base layer of the superposition signal based on priorities associated with the first transmission and the second transmission, a pathloss of the channels between the network entity 105-*a* and the respective UEs 115, a channel quality index (CQI) of the channels between the network entity 105-*a* and the respective UEs 115, the capability of the UE 115-*a* (e.g., whether the UE 115-*a* has interference cancellation capabilities), the capability of the UE 115-*b* (e.g., whether the UE 115-*b* has interference cancellation capabilities), or a combination thereof.

For example, the network entity 105-*a* may determine to transmit the first transmission via the enhanced layer of the superposition signal 220 and transmit the second transmission via the base layer of the superposition signal 220. In such examples, the network entity 105-*a* may transmit the superposition control information 215-*a* (e.g., DCI) to the UE 115-*a* indicating the determination and one or more decoding parameters, such that the UE 115-*a* may perform interference cancellation via the base layer and decode the enhanced layer to receive the first transmission. Alternatively, if the network entity 105-*a* determines to transmit the first transmission via the base layer and the second transmission via the enhanced layer of the superposition signal 220, the network entity 105-*a* may transmit the superposition control information 215-*b* (e.g., DCI) to the UE 115-*b* indicating the determination and one or more decoding parameters, such that the UE 115-*b* may perform interference cancellation via the base layer and decode the enhanced layer to receive the second transmission.

In some examples, the network entity 105-*a* may transmit the superposition control information 215 to both the UE 115-*a* and the UE 115-*b* indicating the determination. In some cases, when the superposition control information 215 is intended for both UEs 115, the network entity 105-*a* may include a respective RNTI configured for each UE 115 in the superposition control information 215, such that the UEs 115 may be able to distinguish the corresponding portion of the superposition control information 215.

In some cases, the network entity 105-*a* may also dynamically determine which transmission out of multiple transmissions to be included in the superposition signal 220. For example, the network entity 105-*a* may communicate with one or more UEs 115 (not shown in FIG. 2) in addition to communicating with the UE 115-*a* and the UE 115-*b*. As such, the network entity 105-*a* may allocate resources for the first transmission (e.g., eMBB) for the UE 115-*a* and allocate resources for a third transmission (e.g., eMBB) for a third UE 115. In such examples, the network entity 105-*a* may schedule the second transmission (e.g., URLLC) for the UE 115-*b* over overlapping resources of either the first or third transmission. That is, the network entity 105-*a* may dynamically determine which transmission of the third UE 115 or UE 115-*a* to include in the superposition signaling based on the capabilities of the UE 115-*a* and the third UE 115 (e.g., whether the UEs 115 are capable of interference rejection combining (IRC)).

For example, if the UE 115-*a* indicated to the network entity 105-*a*, via the UE capability message 210-*a*, a capability to perform interference cancellation and decode the enhanced layer of the superposition signal, while the third UE 115 indicated via a UE capability message 210 an inability to perform interference cancellation or decode the enhanced layer of the superposition signal, the network entity 105-*a* may determine to superimpose the first transmission associated with the UE 115-*a* (e.g., due inability of the third UE 115). That is, the network entity 105-*a* may determine that the first transmission associated with the UE 115-*a* (e.g., the IRC capable UE) is to be superimposed with the second transmission.

In some implementations, the network entity 105-*a* may determine which transmission to transmit via the base layer of the superposition signal 220 and may semi-statically configure (e.g., via RRC signaling) the UEs 115 accordingly. For example, the network entity 105-*a* may indicate to the UE 115-*a* and the UE 115-*b*, via RRC signaling, which transmission is transmitted via the base layer of the superposition signal and maintain communicate with the UE 115-*a* and the UE 115-*b* accordingly.

Figure 3:
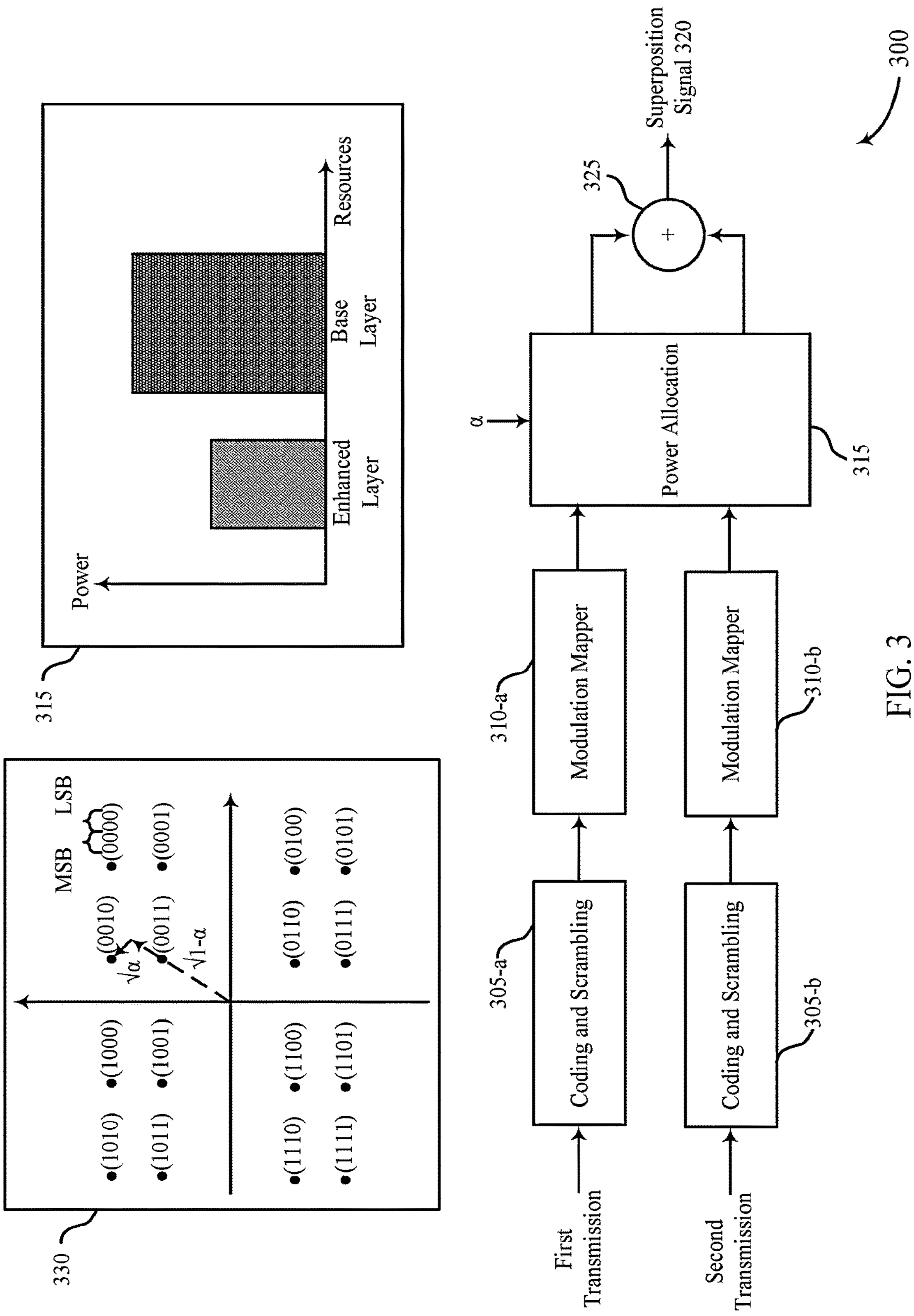
FIG. 3 illustrates an example of a superposition scheme that supports superposition transmission to improve system performance in accordance with one or more aspects of the present disclosure.

FIG. 3 illustrates an example of a superposition scheme 300 that supports superposition transmission to improve system performance in accordance with one or more aspects of the present disclosure. The superposition scheme 300 may implement or be implemented by aspects of wireless communications system 100 and the wireless communications system 200 as described herein with reference to FIGS. 1 and 2. For example, the superposition scheme 300 may be implemented by a network entity, which may be an example of a network entity 105 described herein.

The superposition scheme 300 may support the superposition of a first transmission for a first UE (e.g., such as the first transmission of the UE 115-*a*) with a second transmission for a second UE (e.g., such as the second transmission of the UE 115-*b*) into a superposition signal 320, which may be an example of the superposition signal 220 described herein with reference to FIG. 2. The superposition scheme 300 may include one or more operations performed by the network entity to superimpose the first transmission with the second transmission to generate the superposition signal 320.

In some implementations of the superposition scheme 300, the network entity may determine to transmit the first transmission (e.g., eMBB) and the second transmission via an enhanced layer and a base layer of the superposition signal 320 based on one or more techniques described herein with reference to FIG. 2. As such, at 305-*a* and 305-*b*, respectively, the network entity may code and scramble the first and second transmissions. At 310-*a* and 310-*b*, respectively, the network entity may map the first transmission to a modulation scheme and the second transmission to a modulation scheme in accordance with techniques described herein (e.g., via non-Gray coding or Gray coding in the constellation 330 for the enhanced layer transmission and mapped to the most significant bits of the base layer constellation 330 for the base layer transmission). At 315, the network entity may allocate power for the first transmission and the second transmission, in accordance with one or more parameters (e.g., a power parameter a). In some examples, the power allocated to the transmission via the base layer may be larger (e.g., thereby increasing the reliability of the transmission via the base layer) than the power allocated to the other transmission via the enhanced layer. At 325, the network entity may superimpose the first transmission and second transmission to generate the superposition signal 320.

In some examples, the network entity may superimpose the first transmission and the second transmission according to a bit allocation. For example, after performing the coding and scrambling for the first transmission and second transmission, the network entity may map the bits of the first transmission and the second transmission to a modulation scheme. In systems with quadrature amplitude modulation (QAM) based scheme (e.g., such as constellation 330), the network entity may map the bits of one of the first transmission or second transmission to most significant bits of the modulation symbols, while bits in the other transmission are mapped to least significant bits of the modulation symbols. As an illustrative example, if using a 64 QAM scheme, the network entity may map the two most significant bits of the constellation for one transmission and map the four least significant bits of the constellation for the other transmission. In another illustrative example, the constellation 330 may be an example of a 16 QAM scheme, as such, the network entity may map the two most significant bits of the constellation 330 to one transmission (e.g., 00), while mapping the two least significant bits of the constellation 330 to the other transmission (e.g., 00).

In some examples, the network entity may allocate the bits of the second transmission (e.g., URLLC traffic) to the most significant bits of the modulation scheme and map the bits of the first transmission (e.g., eMBB traffic) to the least significant bits of the modulation scheme (e.g., by default or as defined in a standard). In some other examples, the network entity may dynamically determine which transmission is mapped to the most and least significant bits. In such examples, the network entity may indicate, via superposition control information (e.g., such as superposition control information 215) to the first UE, the second UE, or both, the determination.

In some examples, the network entity may utilize a different (e.g., higher) modulation order for the superposition signal 320 than what was originally scheduled or configured for the first transmission. For example, the network entity may have scheduled the first transmission to use quadrature phase shifting keying (QPSK) modulation scheme. However, based on determining to superimpose the first transmission and second transmission, the network entity may use a QAM scheme (e.g., such as a 16 QAM scheme with the two more bits per modulation symbol used for the second transmission). In such examples, the transport block size of the first transmission (and the transport block size determination by the receiving UE) may remain the same during superposition of the second transmission in overlapping resources.

In some examples, the network entity may use the scheduled (e.g., original or intended) modulation scheme for the first transmission as the modulation scheme for generating the superposition signal 320 in the second set of resources in which superposition occurs. For example, the network entity may have determined to use a QAM scheme (e.g., such as a 64 QAM scheme) for the first transmission. In such examples, the network entity may maintain (e.g., use) the QAM modulations scheme (e.g., the 64 QAM originally scheduled for the first transmission) for the superposition signal 320 in the second set of resources, where the network entity may allocate the least or most significant bits of the QAM scheme for the second transmission. In some cases, the network entity may apply a first modulation scheme to generate the first transmission. If the network entity determines to superimpose the first transmission with the second transmission, the network entity may use that same modulation scheme to generate the superposition signal. In such examples, the network entity may determine whether to map the bits of the second transmission to the most significant bits or least significant bits of the constellation 330 (e.g., based on the modulation and coding scheme selection for the superposition signal).

If the network entity uses the modulation scheme originally allocated for the first transmission for generating the superposition signal in the second set of resources, then the network entity may maintain the transport block size for the first transmission (e.g., the transport block size for the first transmission may remain the same as originally scheduled). In such cases, the UE 115 receiving the first transmission may receive (e.g., puncture) bits allocated for the second transmission. Or, in some examples, the transport block size determination for the first transmission may be changed (e.g., for all or a portion of the allocated resources for the first transmission that are allocated for the second transmission), and a lower modulation order may be used for the TB size determination for the set second of resources where the first and second transmission are super positioned.

In some examples, the network entity may signal, via the superposition control information, one or more parameters to the UEs, such that each UE may decode the superposition signal 320 and receive the respective transmissions based on the determined bit allocation. For example, the superposition control information may indicate to the second UE associated with the second transmission, one or more scrambling IDs (e.g., downlink data channel scrambling IDs), a generated DMRS sequence, or a combination thereof. Likewise, the network entity may transmit to the first UE associated with the first transmission an indication of which modulation scheme is used, whether the modulation scheme changed from the scheduled MCS to a different MCS (e.g., from originally scheduled QAM to QPSK), the bit allocation (e.g., which bits correspond to which transmission), the MCS of the second transmission, a redundancy version, or a combination thereof, such that the UE associated with the first transmission may successfully decode the superposition signal and receive the first transmission, thereby improving performance at the first UE and the second UE in receiving the respective superimposed portions (e.g., the first and second transmissions).

For example, the network entity may transmit, via the superposition control information, IDs used for the downlink data channel scrambling and DMRS sequence generation to the second UE after the transmission of the superposition signal. Additionally, the network entity may indicate, via the superposition control information, whether the modulation scheme changed from the originally scheduled modulation scheme to a different modulation scheme, the bit allocation, or a combination thereof. Further, the network entity may indicate one or more parameters related to the second transmission, such as the redundancy version, modulation and coding scheme, such that the first UE may use them to improve the performance of receiving the first transmission.

Figure 4:
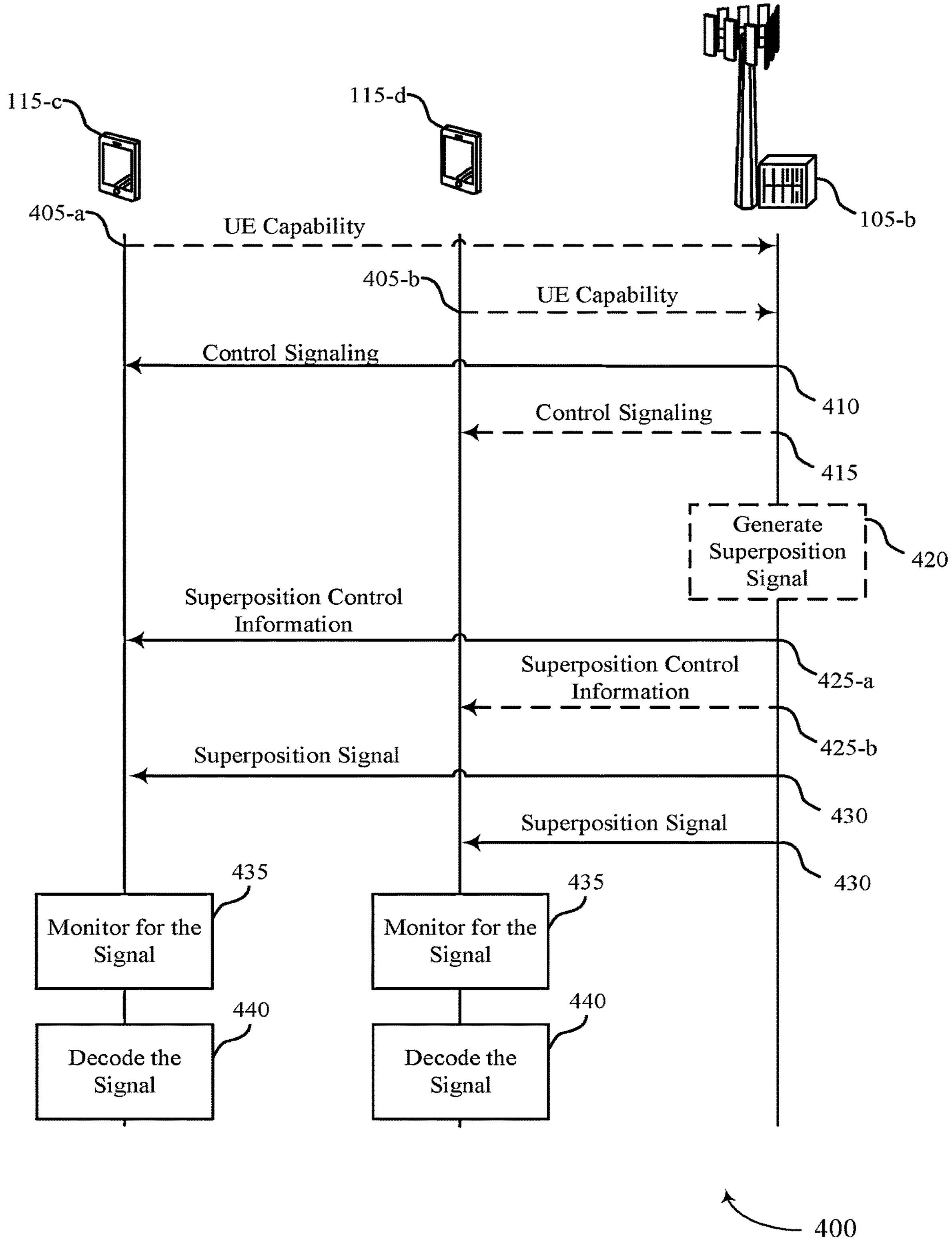
FIG. 4 illustrates an example of a process flow that supports superposition transmission to improve system performance in accordance with one or more aspects of the present disclosure.

FIG. 4 illustrates an example of a process flow 400 that supports superposition transmission to improve system performance in accordance with one or more aspects of the present disclosure. The process flow 400 may be implement, or be implemented, by aspects of the wireless communications system 100, the wireless communications system 200, and the superposition scheme 300 with reference to FIGS. 1 through 3. For example, the process flow 400 may a UE 115-*c*, a UE 115-*d*, and a network entity 105-*b*, which may be examples of corresponding devices described herein with reference to FIGS. 1 through 3. In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405-*a* and 405-*b*, the UE 115-*c*, the UE 115-*d*, or both may transmit a capability message indicating a capability to decode an enhanced layer of a superposition signal. The capability message may be an example of the capability message 210-*b* described herein with reference to FIG. 2. At 410, the network entity 105-*b* may transmit control signaling that schedules a first transmission (e.g., such as a eMBB transmission) via a first set of resources. At 415, the network entity 105-*b* may schedule a second transmission (e.g., such as a URLLC transmission) for the UE 115-*d* and determine to superimpose the first transmission with the second transmission rather than preempting the first transmission. In such examples, the network entity 105-*b* may transmit control signaling to the UE 115-*d* scheduling a second set of resources, where the second set of resources may at least partially overlap with the first set of resources.

In some implementations, the network entity 105-*b* may determine whether to preempt the first transmission (e.g., already scheduled transmission) or to schedule a superimposed transmission. For example, the network entity 105-*b* may determine to preempt the first transmission rather than performing the superposition of the first transmission and second transmission. The network entity 105-*b* may determine to preempt or cancel the first transmission in favor of the second transmission or determine to superimpose the first transmission with the second transmission based on resource availability, priority of the first transmission and the second transmission, a pathloss, a CQI, a modulation order of the first transmission, or a combination thereof.

At 420, the network entity 105-*b* may superimpose the first transmission with the second transmission to generate a superposition signal. The superposition signal may be an example of the superposition signal 220 or superposition signal 320. In some examples, the network entity 105-*b* may determine to superimpose the first transmission and second transmission on an enhanced layer and a base layer of the superposition signal based on the UE capabilities indicated via the capability messages at 405-*a* and 405-*b*. In such examples, the network entity 105-*b* may superimpose the signal in accordance with the techniques described herein with reference to FIG. 2. In some other examples, the network entity 105-*b* may determine to superimpose the first transmission with the second transmission based on a bit. For example, the network entity 105-*b* may allocate a first portion of the superposition signal for the first transmission and a second portion of the superposition signal for the second transmission (e.g., most significant bits or least significant bits) in accordance with the techniques described herein with reference to FIG. 3.

In some examples, the network entity 105-*b* may determine to superimpose the first transmission and the second transmission on separate layers of the superposition signal (e.g., separate MIMO layers). For example, at 410 and 415, the network entity 105-*b* may schedule a first transmission in a first set of resources, and may later schedule a second set of resources that overlap with some or all of the first set of resources. That is, the two transmissions may have overlapping time and frequency resources. As such, the network entity 105-*b* may determine to superimpose the two transmissions via different MIMO layers, such that the UE 115-*c* and the UE 115-*d* may receive the first transmission and second transmission, respectively, via different layers of the superposition signal (e.g., different layers are intended for different UEs). In such examples, the network entity 105-*b* may not manipulate a composite constellation of the two transmissions. Further, the network entity 105-*b* may allocate different power levels for the different MIMO layers.

At 425-*a* and 425-*b*, the network entity 105-*b* may transmit superposition control information indicating the superposition of the second transmission with the first transmission during at least a portion of the first set of resources (e.g., during a portion of the overlapping resources). For example, if the network entity 105-*b* superimposes the first transmission and second transmission via the enhanced layer and the base layer of the superposition signal at 420, the network entity 105-*b* may transmit the superposition control information to the UE 115-*c*, the UE 115-*d*, or both in accordance with the techniques described herein with reference to FIG. 2. Alternatively, if the network entity 105-*b* superimposes the first transmission with the second transmission based on a bit allocation at 420, the network entity 105-*b* may transmit the superposition control information in accordance with the techniques described herein with reference to FIG. 3.

If the network entity 105-*b* superimposes the first transmission and the second transmission via separate MIMO layers at 420, the network entity 105-*b* may transmit the superposition control information, to both the UE 115-*c* and the UE 115-*d*, indicating that the first transmission corresponds to a first transmission layer (e.g., first MIMO layer), the second transmission corresponds to a second transmission layer (e.g., second MIMO layer), and one or more parameters associated with decoding the transmission layers. In such examples, the network entity 105-*b* may transmit the superposition control information messages (e.g., via DCI) prior to transmitting the superposition signal or after transmitting the superposition signal at 430 (e.g., similar to a preemption indication).

In some examples, the network entity 105-*b* may indicate, to the UE 115-*c* (e.g., the UE receiving the first transmission) via the superposition control information, one or more parameters associated with the interfering layer (e.g., the second transmission), such that the UE 115-*c* may perform interference cancellation on the second transmission (e.g., second MIMO layer) and decode the first transmission. The one or more parameters may include a time and frequency resource location of the superposition signal, a MCS of the second transmission (e.g., to be used in interference cancellation of the second MIMO layer), one or more IDs for a DMRS sequence initialization of the second transmission, a DMRS port index of the second transmission, a downlink data channel scrambling for the second transmission, one or more redundancy version parameters, a transport block size determination, an overhead indication, or a combination thereof, such that the UE 115-*c* may perform interference cancellation on the second MIMO layer (e.g., the interfering layer) and decode the superposition signal. For example, the UE 115-*c* may remove the interfering layer (e.g., second MIMO layer) from the received superposition signal via successive interference cancellation (SIC) and decode the remainder of the signal to receive the desired transmission (e.g., the first transmission).

Further, the network entity 105-*b* may indicate, to the UE 115-*d* via the superposition control information, one or more parameters related to the first transmission, such that the UE 115-*d* may perform interference cancellation of the first transmission (e.g., first MIMO layer) and decode the second transmission. The one or more parameters may include the resource allocation of the first transmission, a DMRS configuration of the first transmission (e.g., ID of a DMRS sequence, DMRS port index, or both), one or more scrambling IDs of the first transmission, or a combination thereof. In such examples (e.g., examples of using separate MIMO layers), the network entity 105-*b* may transmit the superposition control information to both the UE 115-*c* and the UE 115-*d* via a DCI scheduling the second transmission, where the network entity 105-*b* may use a DCI format configured to include interfering layer information (e.g., the one or more parameters).

The network entity 105-*b* may transmit the superposition control information (e.g., the indications) in a DCI that schedules the second transmission to the second UE 115-*d*. For example, the network entity 105-*b* may indicate to the second UE 115-*d*, parameters that are related to the first transmission, for the second UE 115-*d* to perform interference cancellation. These parameters may include a resource allocation of the first transmission, a DMRS related configurations, one or scrambling related configurations, or the like. In such cases, the network entity 105-*b* may use DCI that is formatted for carrying interfering layer information, such that each UE 115 may decode the respective transmissions (e.g., information used by the UE 115-*c* and the UE 115-*d* to cancel the interfering layer and decode the desired transmission). In some other examples, the network entity 105-*b* may transmit the superposition control information via separate DCI messages, where the separate DCI messages may be transmitted at the time the second transmission is scheduled (e.g., when sending the DCI scheduling the second transmission.

In some cases, if the network entity 105-*b* determines to preempt the first transmission in favor of the second transmission, the network entity 105-*b* may transmit the superposition control information indicating such a determination. That is the superposition control information may be an extension of the preemption indication, such that it indicates whether preemption or superimposition may occur.

At 430, the network entity 105-*b* may transmit to the UE 115-*c* and the UE 115-*d* the superposition signal via a set of resources that partially overlap with the first set of resources, where the superposition signal includes at least a portion of the first transmission and the second transmission. For example, the network entity 105-*b* may transmit the first transmission and the second transmission via the enhanced layer and the base layer of the superposition signal in accordance with techniques described herein with reference to FIG. 2. In some examples, the network entity 105-*b* may transmit the first transmission and the second transmission via the superposition signal based on a bit allocation in accordance with the techniques described herein with reference to FIG. 3. In some other examples, the network entity 105-*b* may transmit the first transmission and the second transmission via separate MIMO layers (e.g., a first transmission layer and a second transmission layer) of the superposition signal in accordance with the techniques described herein with reference to FIG. 5.

At 435, the UE 115-*c* and the UE 115-*d* may monitor the set of resources for the superposition signal. At 440, the UE 115-*c* and the UE 115-*d* may decode the superposition signal to receive the first transmission and second transmission based on the superposition control information. For example, if the network entity 105-*b* superimposes the first transmission and second transmission via the enhanced layer and the base layer of the superposition signal at 420, the UEs 115 may decode the superposition signal in accordance with the techniques described herein with reference to FIG. 2.

Additionally, or alternatively, if the network entity 105-*b* superimposes the first transmission with the second transmission based on a bit allocation at 420, the UE 115-*c* and the UE 115-*d* may decode the superposition signal in accordance with the techniques described herein with reference to FIG. 3.

If the network entity 105-*b* superimposes the first transmission and the second transmission via separate MIMO layers at 420, the UE 115-*c* and the UE 115-*d* may decode the superposition signal based on the one or more parameters indicated in the superposition control information at 425-*a* and 425-*b*. For example, the UE 115-*c* may use the one or more parameters of the second transmission indicated in the superposition control information to decode, reconstruct, and cancel the second transmission layer from the superposition signal and decode the first transmission layer to receive the first transmission. Likewise, the UE 115-*d* may use the one or more parameters of the first transmission to decode, reconstruct, and cancel the first transmission layer from the superposition signal and decode the second transmission layer to receive the second transmission. In the case that the network entity 105-*b* transmits the superposition control after the superposition signal, the UEs 115 may re-process the overlapping portions of the superposition signal to decode the respective transmissions. For example, the UE 115-*c* may remove the interfering layer (e.g., second MIMO layer) from the superposition signal via SIC and decode the remainder of the signal to obtain the desired transmission (e.g., the first transmission) based on the one or more parameters indicated via the superposition control information. Likewise, the UE 115-*d* may remove the interfering layer (e.g., first MIMO layer) from the superposition signal via SIC and decode the remainder of the signal to obtain the second transmission.

In this way, the network entity 105-*b* may superimpose the first transmission with the second transmission based on composite constellation with power adaption as described herein with reference to FIG. 2 (e.g., according to a first MUST category). Alternatively, the network entity 105-*b* may superimpose the first transmission with the second transmission according to a regular constellation with bit allocation as described herein with reference to FIG. 3 (e.g., according to a second MUST category). In some examples, the network entity 105-*b* may superimpose the first transmission with the second transmission according to MIMO-type superposition with superimposed transmissions in different layers as described herein with reference to FIG. 4 (e.g., according to a third MUST category).

Figure 5:
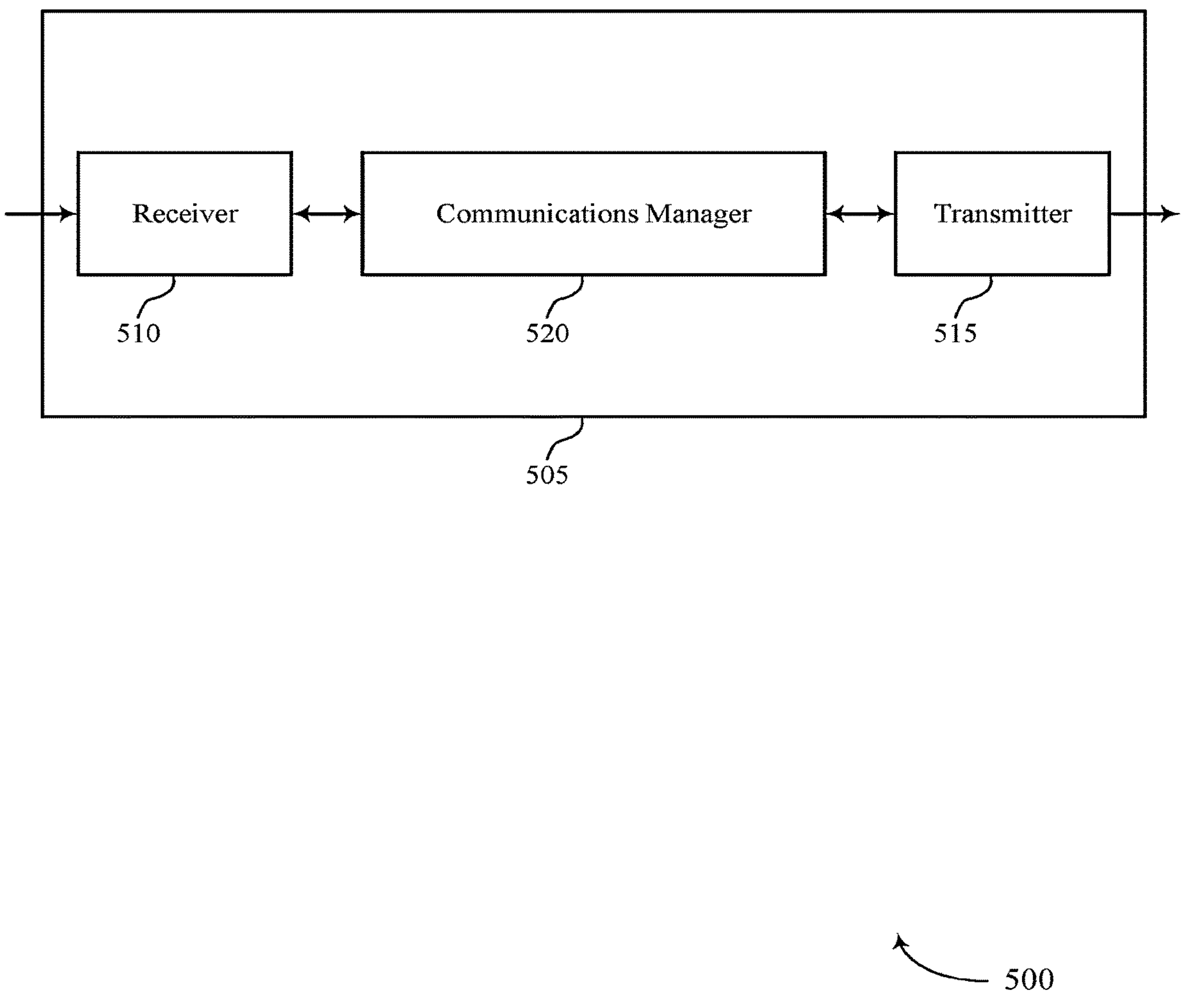
FIGS. 5 and 6 illustrate block diagrams of devices that support superposition transmission to improve system performance in accordance with one or more aspects of the present disclosure.

FIG. 5 illustrates a block diagram 500 of a device 505 that supports superposition transmission to improve system performance in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to superposition transmission to improve system performance). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to superposition transmission to improve system performance). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of superposition transmission to improve system performance as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving control signaling scheduling a first transmission via a first set of resources. The communications manager 520 may be configured as or otherwise support a means for receiving superposition control information that indicates superposition of a second transmission and the first transmission during at least a portion of the first set of resources based at least on part on the second transmission having a higher priority than the first transmission. The communications manager 520 may be configured as or otherwise support a means for monitoring the first set of resources for the first transmission based on the control signaling. The communications manager 520 may be configured as or otherwise support a means for decoding a superposition signal including the first transmission and the second transmission to receive the first transmission via the first set of resources based on the superposition control information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for superimposing a first transmission with a second transmission in favor of preemption or cancellation, which may result in more efficient utilization of communication resources.

Figure 6:
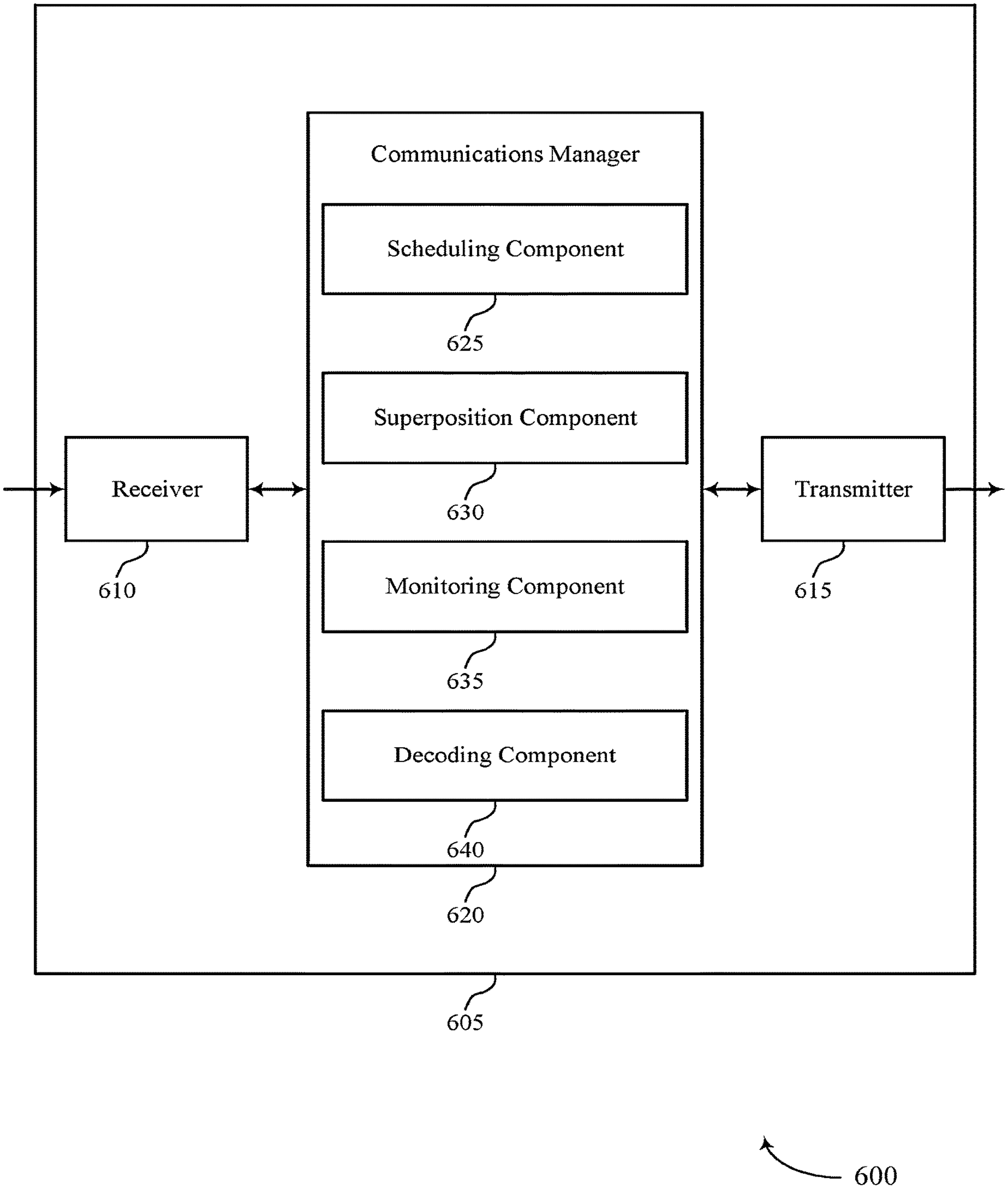

FIG. 6 illustrates a block diagram 600 of a device 605 that supports superposition transmission to improve system performance in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to superposition transmission to improve system performance). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to superposition transmission to improve system performance). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of superposition transmission to improve system performance as described herein. For example, the communications manager 620 may include a scheduling component 625, a superposition component 630, a monitoring component 635, a decoding component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The scheduling component 625 may be configured as or otherwise support a means for receiving control signaling scheduling a first transmission via a first set of resources. The superposition component 630 may be configured as or otherwise support a means for receiving superposition control information that indicates superposition of a second transmission and the first transmission during at least a portion of the first set of resources based at least on part on the second transmission having a higher priority than the first transmission. The monitoring component 635 may be configured as or otherwise support a means for monitoring the first set of resources for the first transmission based on the control signaling. The decoding component 640 may be configured as or otherwise support a means for decoding a superposition signal including the first transmission and the second transmission to receive the first transmission via the first set of resources based on the superposition control information.

Figure 7:
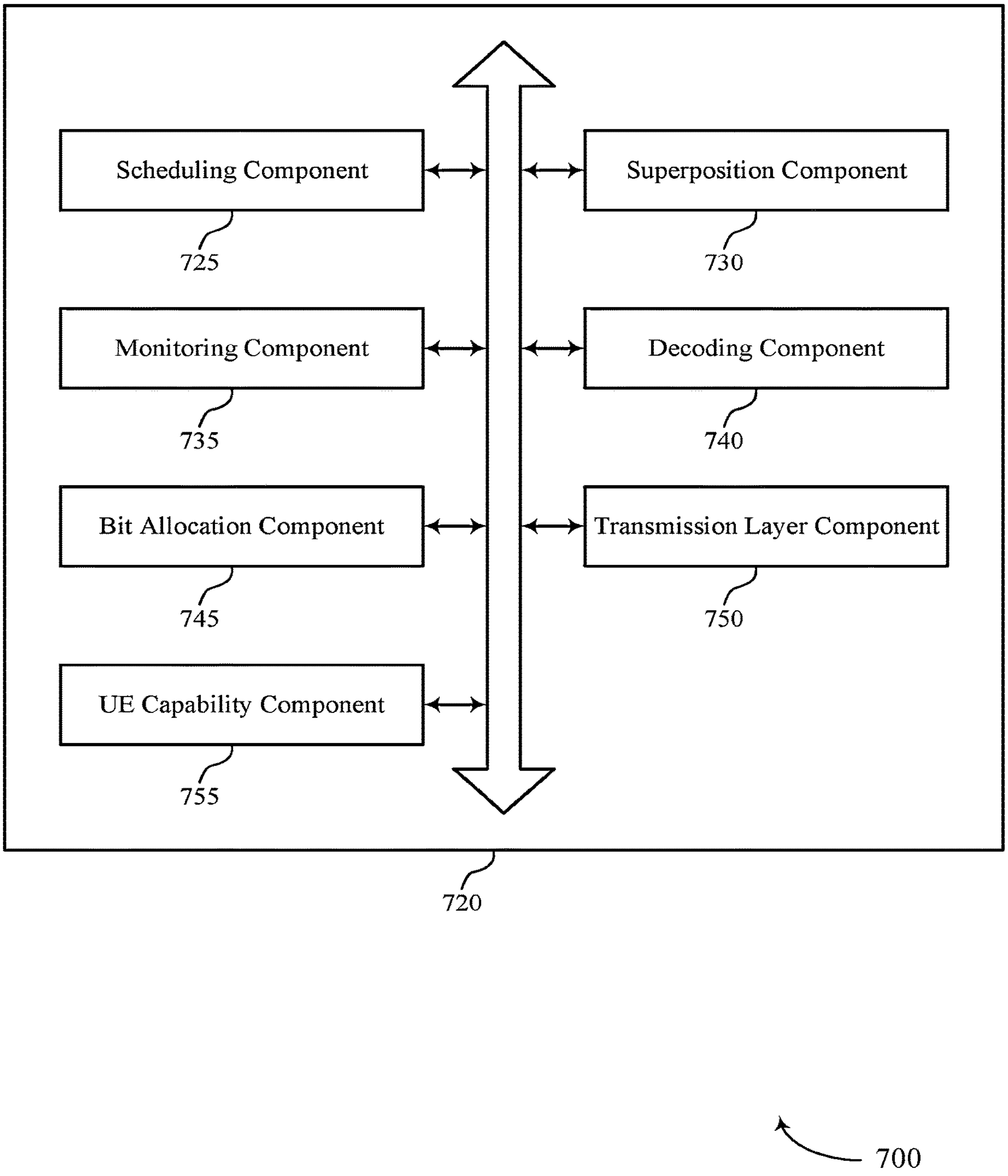
FIG. 7 illustrates a block diagram of a communications manager that supports superposition transmission to improve system performance in accordance with one or more aspects of the present disclosure.

FIG. 7 illustrates a block diagram 700 of a communications manager 720 that supports superposition transmission to improve system performance in accordance with one or more aspects of the present disclosure. The communications manager 720 may be an example of aspects of a communications manager 520, a communications manager 620, or both, as described herein. The communications manager 720, or various components thereof, may be an example of means for performing various aspects of superposition transmission to improve system performance as described herein. For example, the communications manager 720 may include a scheduling component 725, a superposition component 730, a monitoring component 735, a decoding component 740, a bit allocation component 745, a transmission layer component 750, a UE capability component 755, or any combination thereof. Each of these components may communicate, directly or indirectly, with one another (e.g., via one or more buses).

The communications manager 720 may support wireless communication at a UE in accordance with examples as disclosed herein. The scheduling component 725 may be configured as or otherwise support a means for receiving control signaling scheduling a first transmission via a first set of resources. The superposition component 730 may be configured as or otherwise support a means for receiving superposition control information that indicates superposition of a second transmission and the first transmission during at least a portion of the first set of resources based at least on part on the second transmission having a higher priority than the first transmission. The monitoring component 735 may be configured as or otherwise support a means for monitoring the first set of resources for the first transmission based on the control signaling. The decoding component 740 may be configured as or otherwise support a means for decoding a superposition signal including the first transmission and the second transmission to receive the first transmission via the first set of resources based on the superposition control information.

In some examples, the superposition component 730 may be configured as or otherwise support a means for receiving, in the superposition control information, an indication of whether the first transmission is to be transmitted via an enhanced layer of the superposition signal or a base layer of the superposition signal, where receiving the first transmission is based on the indication.

In some examples, the bit allocation component 745 may be configured as or otherwise support a means for receiving, in the superposition control information, an indication that a first portion of the superposition signal is allocated for the first transmission and a second portion of the superposition signal is allocated for the second transmission, where receiving the first transmission is based on receiving the indication.

In some examples, the first portion corresponds to a set of least significant bits of the superposition signal and the second portion corresponds to a set of most significant bits of the superposition signal.

In some examples, the first portion corresponds to a set of most significant bits of the superposition signal and the second portion corresponds to a set of least significant bits of the superposition signal.

In some examples, to support receiving the first transmission, the decoding component 740 may be configured as or otherwise support a means for decoding an enhanced layer of the superposition signal including the enhanced layer and a base layer, the base layer associated with the second transmission.

In some examples, to support receiving the first transmission, the decoding component 740 may be configured as or otherwise support a means for decoding a base layer of the superposition signal including an enhanced layer and the base layer, the enhanced layer associated with the second transmission.

In some examples, to support receiving the first transmission, the decoding component 740 may be configured as or otherwise support a means for decoding the superposition signal to obtain the first transmission from a base layer of the superposition signal based on the second transmission having the higher priority than the first transmission.

In some examples, the transmission layer component 750 may be configured as or otherwise support a means for receiving, in the superposition control information, an indication that the first transmission corresponds to a first transmission layer of the superposition signal and the second transmission corresponds to a second transmission layer of the superposition signal, the superposition control information indicating one or more parameters associated with the second transmission layer, where decoding the superposition signal includes. In some examples, the decoding component 740 may be configured as or otherwise support a means for decoding the superposition signal to obtain the first transmission from the first transmission layer of the superposition signal based on one or more parameters associated with the second transmission layer.

In some examples, the superposition control information indicates a time and frequency location of the superposition signal, a power parameter associated with the superposition signal, a modulation and coding scheme associated with the superposition signal, a channel identifier associated with the superposition signal, a demodulation reference signal identifier, or a combination thereof.

In some examples, the UE capability component 755 may be configured as or otherwise support a means for transmitting, to a network entity, a capability message indicating a capability to decode an enhanced layer of the superposition signal, where receiving the superposition control information that indicates the superposition of the second transmission is based on the capability message.

Figure 8:
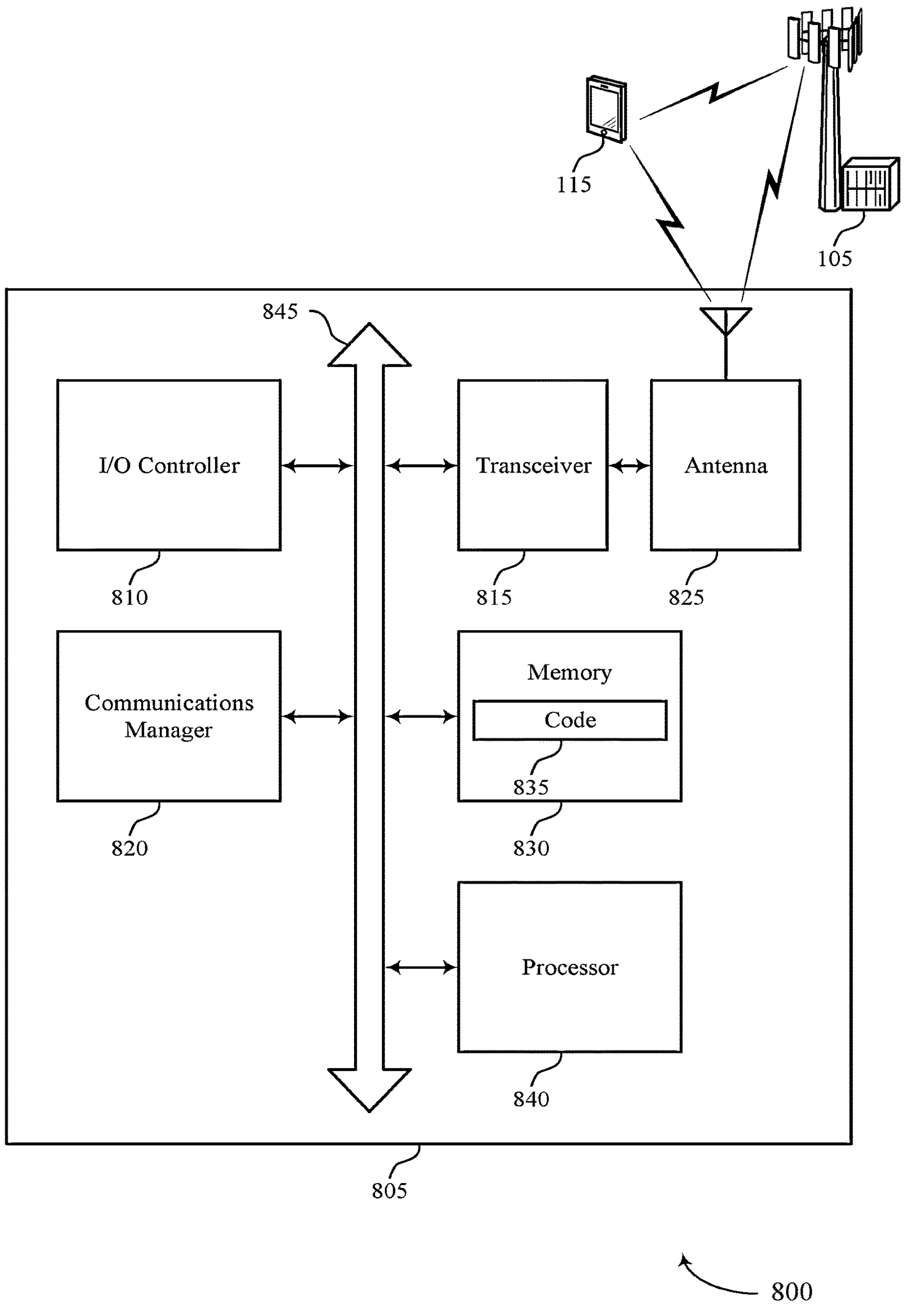
FIG. 8 illustrates a diagram of a system including a device that supports superposition transmission to improve system performance in accordance with one or more aspects of the present disclosure.

FIG. 8 illustrates a diagram of a system 800 including a device 805 that supports superposition transmission to improve system performance in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting superposition transmission to improve system performance). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling scheduling a first transmission via a first set of resources. The communications manager 820 may be configured as or otherwise support a means for receiving superposition control information that indicates superposition of a second transmission and the first transmission during at least a portion of the first set of resources based at least on part on the second transmission having a higher priority than the first transmission. The communications manager 820 may be configured as or otherwise support a means for monitoring the first set of resources for the first transmission based on the control signaling. The communications manager 820 may be configured as or otherwise support a means for decoding a superposition signal including the first transmission and the second transmission to receive the first transmission via the first set of resources based on the superposition control information.

By including or configuring the communications manager 820 in accordance with examples as described herein, the device 805 may support techniques for superimposing a first transmission with a second transmission in favor of preemption or cancellation, which may improve communication reliability, reduce latency, and result in more efficient utilization of communication resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of superposition transmission to improve system performance as described herein, or the processor 840 and the memory 830 may be otherwise configured to perform or support such operations.

Figure 9:
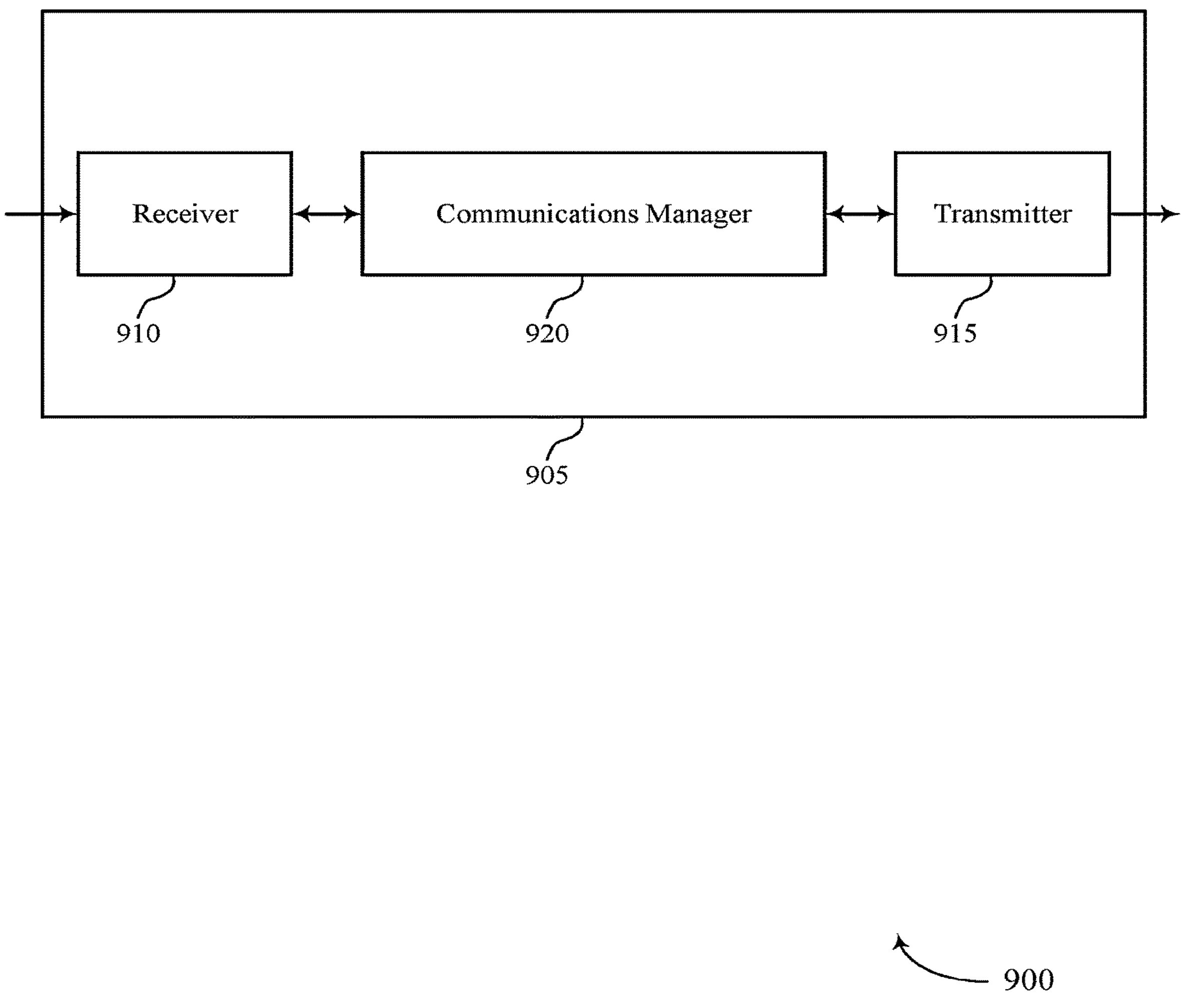
FIGS. 9 and 10 illustrate block diagrams of devices that support superposition transmission to improve system performance in accordance with one or more aspects of the present disclosure.

FIG. 9 illustrates a block diagram 900 of a device 905 that supports superposition transmission to improve system performance in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of superposition transmission to improve system performance as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a first UE, control signaling scheduling a first transmission via a first set of resources. The communications manager 920 may be configured as or otherwise support a means for transmitting, to the first UE, a second UE, or both, superposition control information that indicates superposition of a second transmission and the first transmission during at least a portion of the first set of resources based at least on part on the second transmission having a higher priority than the first transmission. The communications manager 920 may be configured as or otherwise support a means for transmitting, to the first UE, the second UE, or both, a superposition signal via a second set of resources that at least partially overlap with the first set of resources, the superposition signal including at least a portion of the first transmission and the second transmission.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for superimposing a first transmission with a second transmission in favor of preemption or cancellation, which may result in more efficient utilization of communication resources.

Figure 10:
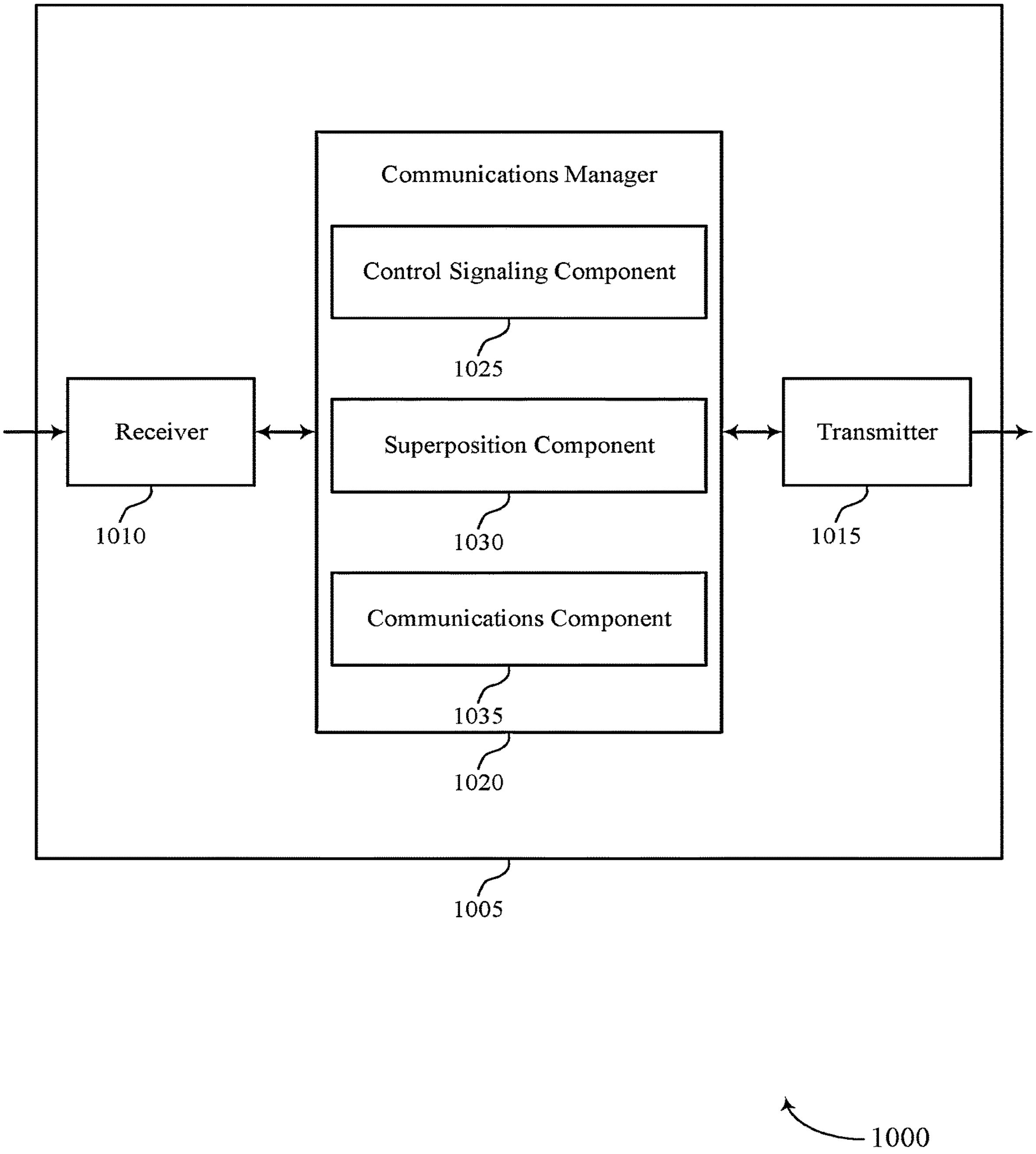

FIG. 10 illustrates a block diagram 1000 of a device 1005 that supports superposition transmission to improve system performance in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of superposition transmission to improve system performance as described herein. For example, the communications manager 1020 may include a control signaling component 1025, a superposition component 1030, a communications component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The control signaling component 1025 may be configured as or otherwise support a means for transmitting, to a first UE, control signaling scheduling a first transmission via a first set of resources. The superposition component 1030 may be configured as or otherwise support a means for transmitting, to the first UE, a second UE, or both, superposition control information that indicates superposition of a second transmission and the first transmission during at least a portion of the first set of resources based at least on part on the second transmission having a higher priority than the first transmission. The communications component 1035 may be configured as or otherwise support a means for transmitting, to the first UE, the second UE, or both, a superposition signal via a second set of resources that at least partially overlap with the first set of resources, the superposition signal including at least a portion of the first transmission and the second transmission.

Figure 11:
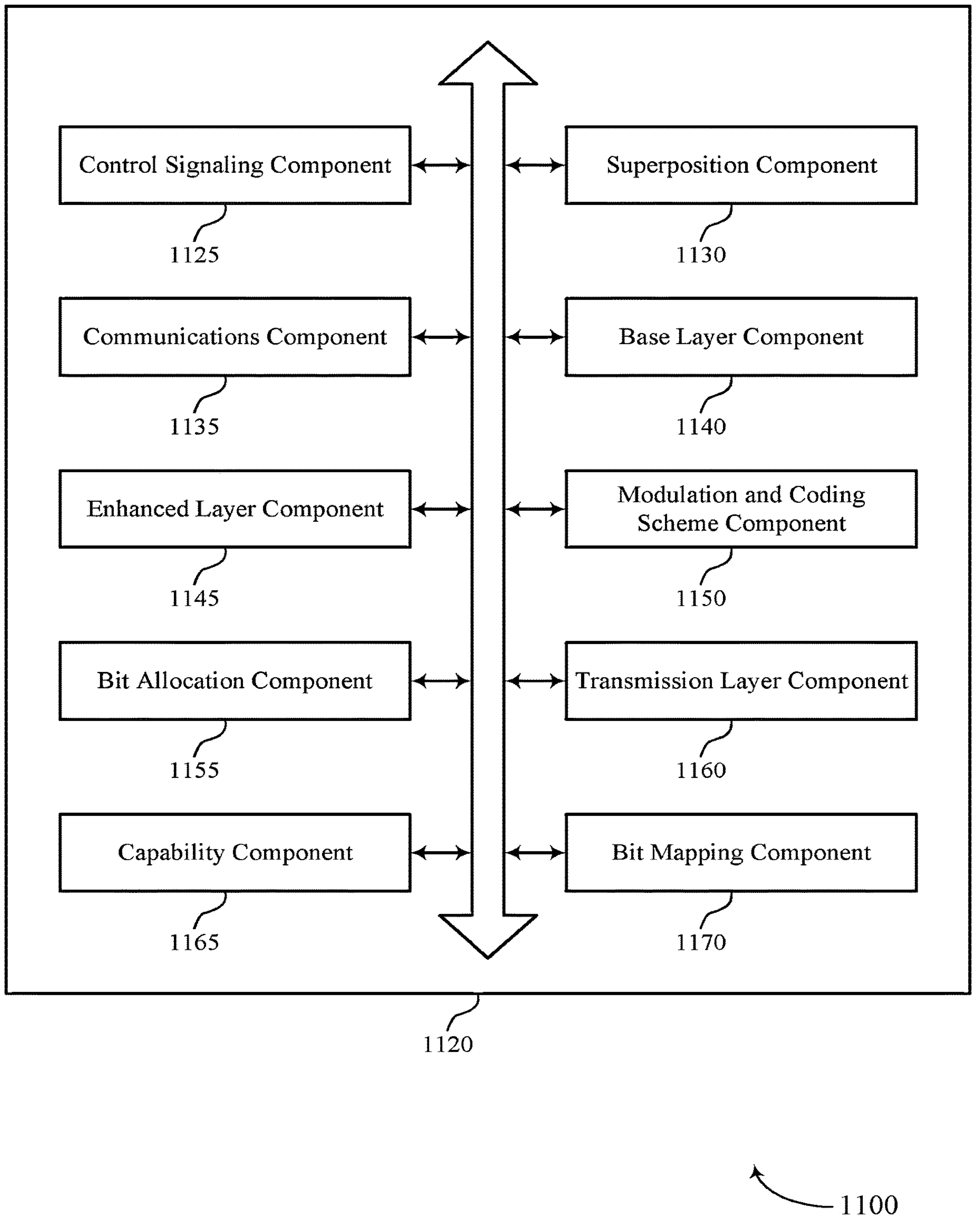
FIG. 11 illustrates a block diagram of a communications manager that supports superposition transmission to improve system performance in accordance with one or more aspects of the present disclosure.

FIG. 11 illustrates a block diagram 1100 of a communications manager 1120 that supports superposition transmission to improve system performance in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of superposition transmission to improve system performance as described herein. For example, the communications manager 1120 may include a control signaling component 1125, a superposition component 1130, a communications component 1135, a base layer component 1140, an enhanced layer component 1145, a modulation and coding scheme component 1150, a bit allocation component 1155, a transmission layer component 1160, a capability component 1165, a bit mapping component 1170, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The control signaling component 1125 may be configured as or otherwise support a means for transmitting, to a first UE, control signaling scheduling a first transmission via a first set of resources. The superposition component 1130 may be configured as or otherwise support a means for transmitting, to the first UE, a second UE, or both, superposition control information that indicates superposition of a second transmission and the first transmission during at least a portion of the first set of resources based at least on part on the second transmission having a higher priority than the first transmission. The communications component 1135 may be configured as or otherwise support a means for transmitting, to the first UE, the second UE, or both, a superposition signal via a second set of resources that at least partially overlap with the first set of resources, the superposition signal including at least a portion of the first transmission and the second transmission.

In some examples, to support transmitting the superposition signal, the base layer component 1140 may be configured as or otherwise support a means for transmitting the second transmission via a base layer of the superposition signal. In some examples, to support transmitting the superposition signal, the enhanced layer component 1145 may be configured as or otherwise support a means for transmitting the first transmission via an enhanced layer of the superposition signal.

In some examples, to support transmitting the superposition signal, the enhanced layer component 1145 may be configured as or otherwise support a means for transmitting the second transmission via an enhanced layer of the superposition signal. In some examples, to support transmitting the superposition signal, the base layer component 1140 may be configured as or otherwise support a means for transmitting the first transmission via a base layer of the superposition signal.

In some examples, the superposition control information indicates a time and frequency location of the superposition signal, a base layer or an enhanced layer associated with first transmission, a power parameter associated with the superposition signal, a modulation and coding scheme associated with the superposition signal, a channel identifier associated with the superposition signal, a demodulation reference signal identifier associated with the superposition signal, or a combination thereof.

In some examples, to support transmitting the superposition signal, the modulation and coding scheme component 1150 may be configured as or otherwise support a means for transmitting the superposition signal in accordance with a first modulation and coding scheme for the first transmission and a second modulation and coding scheme for the second transmission.

In some examples, the communications component 1135 may be configured as or otherwise support a means for transmitting the superposition control information including an indication of the first modulation and coding scheme, the second modulation and coding scheme, or both.

In some examples, to support transmitting the superposition signal, the communications component 1135 may be configured as or otherwise support a means for transmitting the superposition signal including the first transmission as one of a base layer or an enhanced layer based on one or more parameters associated with the first UE and the second transmission as one of the base layer or the enhanced layer based on one or more parameters associated with the second UE.

In some examples, the superposition component 1130 may be configured as or otherwise support a means for transmitting the superposition control information that includes an indication of the base layer and the enhanced layer.

In some examples, the one or more parameters include a priority level, a pathloss, a channel quality, a device capability, or any combination thereof.

In some examples, the bit allocation component 1155 may be configured as or otherwise support a means for transmitting the superposition control information that includes an indication that a first portion of the superposition signal is allocated for the first transmission and a second portion of the superposition signal is allocated for the second transmission.

In some examples, the bit mapping component 1170 may be configured as or otherwise support a means for mapping the first transmission to a set of multiple least significant bits of the superposition signal. In some examples, the bit mapping component 1170 may be configured as or otherwise support a means for mapping the second transmission to a set of multiple most significant bits of the superposition signal, where transmitting the superposition signal is based on the mapping.

In some examples, the bit mapping component 1170 may be configured as or otherwise support a means for mapping the first transmission to a set of multiple most significant bits of the superposition signal. In some examples, the bit mapping component 1170 may be configured as or otherwise support a means for mapping the second transmission to a set of multiple least significant bits of the superposition signal, where transmitting the superposition signal is based on the mapping.

In some examples, to support transmitting the superposition signal, the transmission layer component 1160 may be configured as or otherwise support a means for transmitting a first transmission layer of the superposition signal that includes the first transmission via. In some examples, to support transmitting the superposition signal, the transmission layer component 1160 may be configured as or otherwise support a means for transmitting a second transmission layer of the superposition signal that includes the second transmission.

In some examples, the superposition component 1130 may be configured as or otherwise support a means for transmitting the superposition control information that includes an indication that the first transmission corresponds to the first transmission layer and the second transmission corresponds to the second transmission layer, the superposition control information indicating one or more parameters associated with the first transmission layer, the second transmission layer, or both.

In some examples, the capability component 1165 may be configured as or otherwise support a means for receiving a capability message indicating a capability to decode an enhanced layer of the superposition signal, where transmitting the superposition signal is based on the capability message.

Figure 12:
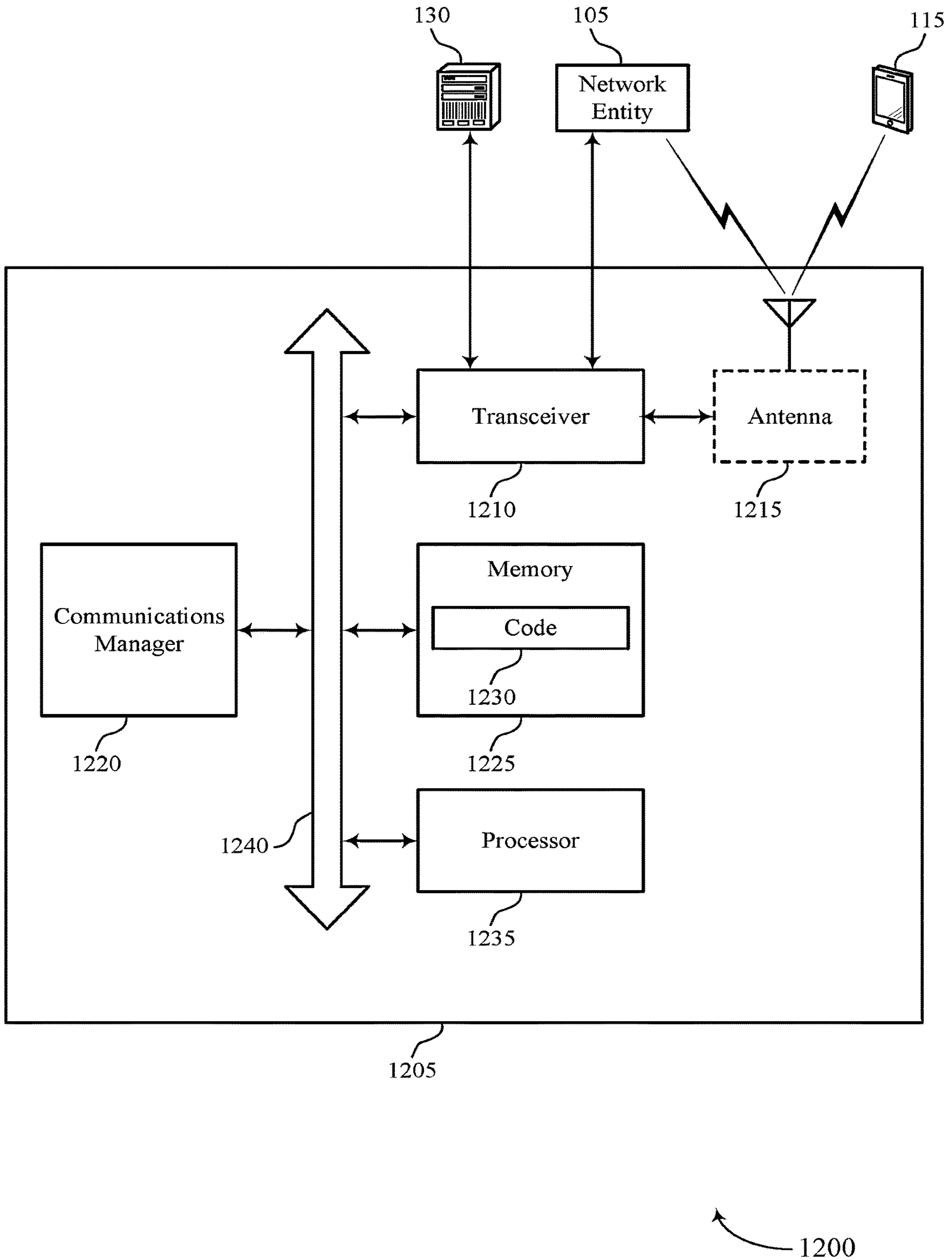
FIG. 12 illustrates a diagram of a system including a device that supports superposition transmission to improve system performance in accordance with one or more aspects of the present disclosure.

FIG. 12 illustrates a diagram of a system 1200 including a device 1205 that supports superposition transmission to improve system performance in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting superposition transmission to improve system performance). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a first UE, control signaling scheduling a first transmission via a first set of resources. The communications manager 1220 may be configured as or otherwise support a means for transmitting, to the first UE, a second UE, or both, superposition control information that indicates superposition of a second transmission and the first transmission during at least a portion of the first set of resources based at least on part on the second transmission having a higher priority than the first transmission. The communications manager 1220 may be configured as or otherwise support a means for transmitting, to the first UE, the second UE, or both, a superposition signal via a second set of resources that at least partially overlap with the first set of resources, the superposition signal including at least a portion of the first transmission and the second transmission.

By including or configuring the communications manager 1220 in accordance with examples as described herein, the device 1205 may support techniques for superimposing a first transmission with a second transmission in favor of preemption or cancellation, which may improve communication reliability, reduce latency, and result in more efficient utilization of communication resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of superposition transmission to improve system performance as described herein, or the processor 1235 and the memory 1225 may be otherwise configured to perform or support such operations.

Figure 13:
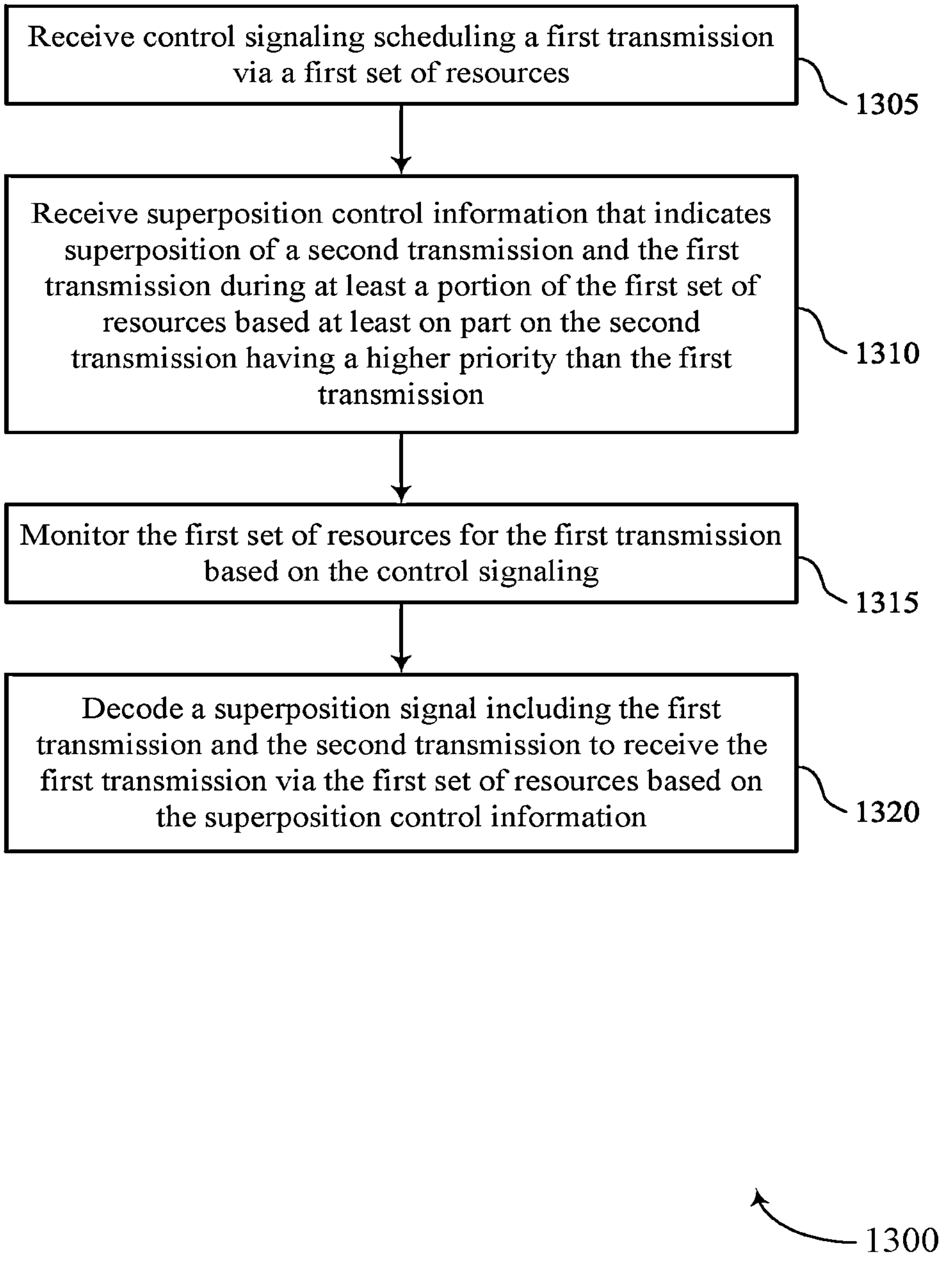
FIGS. 13 through 16 illustrate flowcharts showing methods that support superposition transmission to improve system performance in accordance with one or more aspects of the present disclosure.

FIG. 13 illustrates a flowchart illustrating a method 1300 that supports superposition transmission to improve system performance in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling scheduling a first transmission via a first set of resources. The operations of 1305 may be performed in accordance with examples as disclosed herein. In some examples, aspects of the operations of 1305 may be performed by a scheduling component 725 as described with reference to FIG. 7.

At 1310, the method may include receiving superposition control information that indicates superposition of a second transmission and the first transmission during at least a portion of the first set of resources based at least on part on the second transmission having a higher priority than the first transmission. The operations of 1310 may be performed in accordance with examples as disclosed herein. In some examples, aspects of the operations of 1310 may be performed by a superposition component 730 as described with reference to FIG. 7.

At 1315, the method may include monitoring the first set of resources for the first transmission based on the control signaling. The operations of 1315 may be performed in accordance with examples as disclosed herein. In some examples, aspects of the operations of 1315 may be performed by a monitoring component 735 as described with reference to FIG. 7.

At 1320, the method may include decoding a superposition signal including the first transmission and the second transmission to receive the first transmission via the first set of resources based on the superposition control information. The operations of 1320 may be performed in accordance with examples as disclosed herein. In some examples, aspects of the operations of 1320 may be performed by a decoding component 740 as described with reference to FIG. 7.

Figure 14:
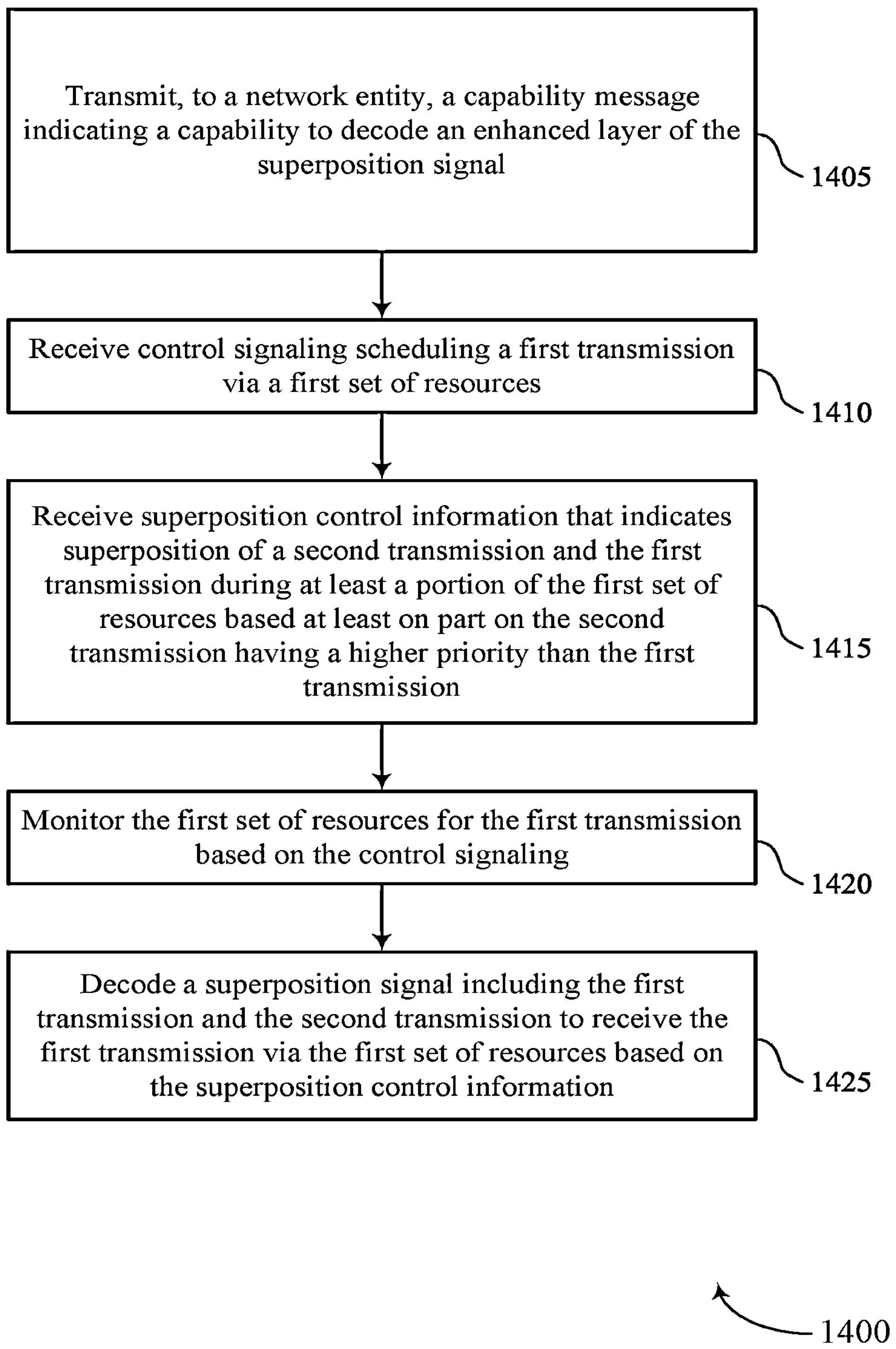

FIG. 14 illustrates a flowchart illustrating a method 1400 that supports superposition transmission to improve system performance in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, a capability message indicating a capability to decode an enhanced layer of the superposition signal. The operations of 1405 may be performed in accordance with examples as disclosed herein. In some examples, aspects of the operations of 1405 may be performed by a UE capability component 755 as described with reference to FIG. 7.

At 1410, the method may include receiving control signaling scheduling a first transmission via a first set of resources. The operations of 1410 may be performed in accordance with examples as disclosed herein. In some examples, aspects of the operations of 1410 may be performed by a scheduling component 725 as described with reference to FIG. 7.

At 1415, the method may include receiving superposition control information that indicates superposition of a second transmission and the first transmission during at least a portion of the first set of resources based at least on part on the second transmission having a higher priority than the first transmission. The operations of 1415 may be performed in accordance with examples as disclosed herein. In some examples, aspects of the operations of 1415 may be performed by a superposition component 730 as described with reference to FIG. 7.

At 1420, the method may include monitoring the first set of resources for the first transmission based on the control signaling. The operations of 1420 may be performed in accordance with examples as disclosed herein. In some examples, aspects of the operations of 1420 may be performed by a monitoring component 735 as described with reference to FIG. 7.

At 1425, the method may include decoding a superposition signal including the first transmission and the second transmission to receive the first transmission via the first set of resources based on the superposition control information. The operations of 1425 may be performed in accordance with examples as disclosed herein. In some examples, aspects of the operations of 1425 may be performed by a decoding component 740 as described with reference to FIG. 7.

Figure 15:
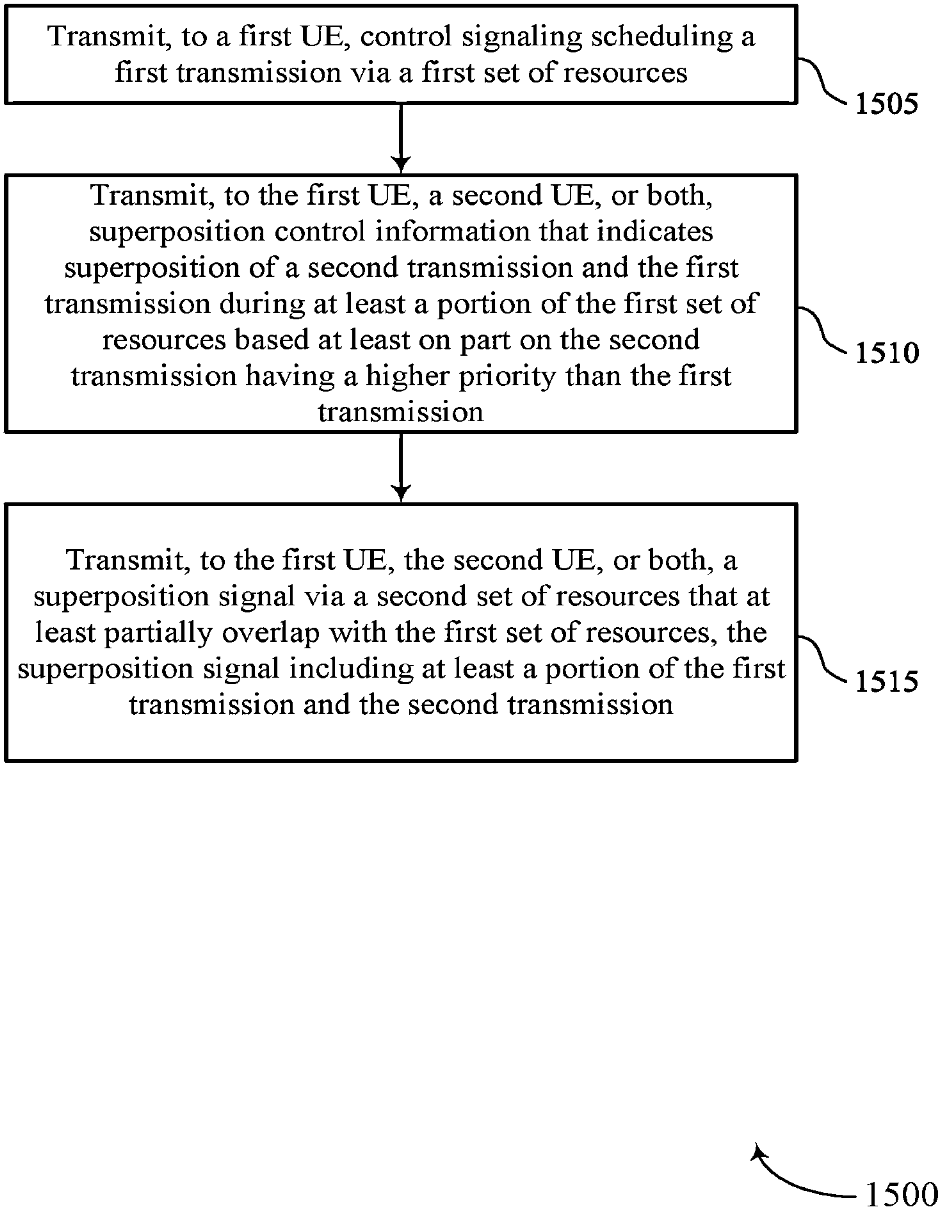

FIG. 15 illustrates a flowchart illustrating a method 1500 that supports superposition transmission to improve system performance in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a first UE, control signaling scheduling a first transmission via a first set of resources. The operations of 1505 may be performed in accordance with examples as disclosed herein. In some examples, aspects of the operations of 1505 may be performed by a control signaling component 1125 as described with reference to FIG. 11.

At 1510, the method may include transmitting, to the first UE, a second UE, or both, superposition control information that indicates superposition of a second transmission and the first transmission during at least a portion of the first set of resources based at least on part on the second transmission having a higher priority than the first transmission. The operations of 1510 may be performed in accordance with examples as disclosed herein. In some examples, aspects of the operations of 1510 may be performed by a superposition component 1130 as described with reference to FIG. 11.

At 1515, the method may include transmitting, to the first UE, the second UE, or both, a superposition signal via a second set of resources that at least partially overlap with the first set of resources, the superposition signal including at least a portion of the first transmission and the second transmission. The operations of 1515 may be performed in accordance with examples as disclosed herein. In some examples, aspects of the operations of 1515 may be performed by a communications component 1135 as described with reference to FIG. 11.

Figure 16:
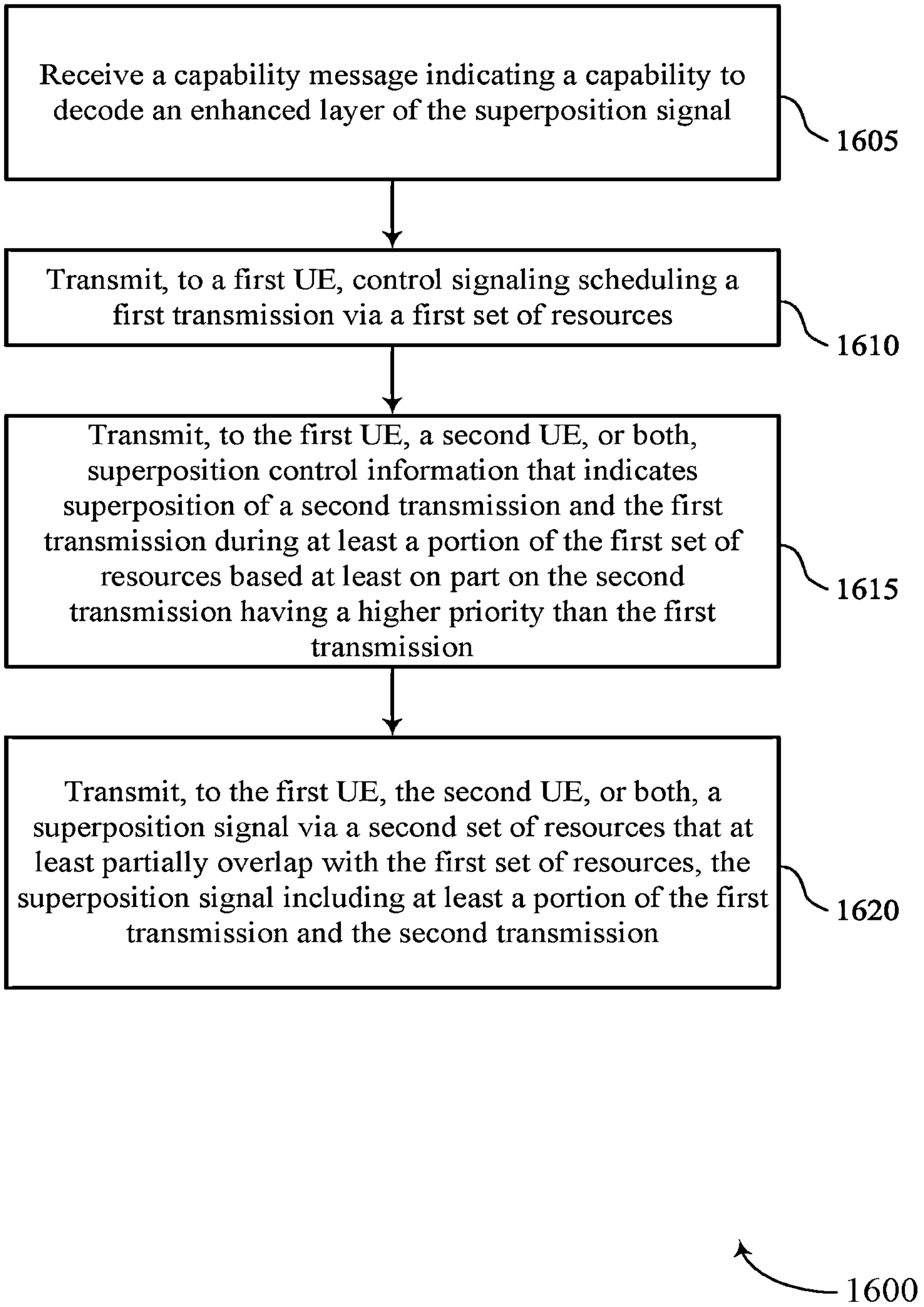

FIG. 16 illustrates a flowchart illustrating a method 1600 that supports superposition transmission to improve system performance in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving a capability message indicating a capability to decode an enhanced layer of the superposition signal. The operations of 1605 may be performed in accordance with examples as disclosed herein. In some examples, aspects of the operations of 1605 may be performed by a capability component 1165 as described with reference to FIG. 11.

At 1610, the method may include transmitting, to a first UE, control signaling scheduling a first transmission via a first set of resources. The operations of 1610 may be performed in accordance with examples as disclosed herein. In some examples, aspects of the operations of 1610 may be performed by a control signaling component 1125 as described with reference to FIG. 11.

At 1615, the method may include transmitting, to the first UE, a second UE, or both, superposition control information that indicates superposition of a second transmission and the first transmission during at least a portion of the first set of resources based at least on part on the second transmission having a higher priority than the first transmission. The operations of 1615 may be performed in accordance with examples as disclosed herein. In some examples, aspects of the operations of 1615 may be performed by a superposition component 1130 as described with reference to FIG. 11.

At 1620, the method may include transmitting, to the first UE, the second UE, or both, a superposition signal via a second set of resources that at least partially overlap with the first set of resources, the superposition signal including at least a portion of the first transmission and the second transmission. The operations of 1620 may be performed in accordance with examples as disclosed herein. In some examples, aspects of the operations of 1620 may be performed by a communications component 1135 as described with reference to FIG. 11.

The following provides an overview of aspects of the present disclosure:

Aspect 1: A method for wireless communication at a UE, comprising: receiving control signaling scheduling a first transmission via a first set of resources; receiving superposition control information that indicates superposition of a second transmission and the first transmission during at least a portion of the first set of resources based at least on part on the second transmission having a higher priority than the first transmission; monitoring the first set of resources for the first transmission based at least in part on the control signaling; and decoding a superposition signal comprising the first transmission and the second transmission to receive the first transmission via the first set of resources based at least in part on the superposition control information.

Aspect 2: The method of aspect 1, further comprising: receiving, in the superposition control information, an indication of whether the first transmission is to be transmitted via an enhanced layer of the superposition signal or a base layer of the superposition signal, wherein receiving the first transmission is based at least in part on the indication.

Aspect 3: The method of aspect 1, further comprising: receiving, in the superposition control information, an indication that a first portion of the superposition signal is allocated for the first transmission and a second portion of the superposition signal is allocated for the second transmission, wherein receiving the first transmission is based at least in part on receiving the indication.

Aspect 4: The method of aspect 3, wherein the first portion corresponds to a set of least significant bits of the superposition signal and the second portion corresponds to a set of most significant bits of the superposition signal.

Aspect 5: The method of aspect 3, wherein the first portion corresponds to a set of most significant bits of the superposition signal and the second portion corresponds to a set of least significant bits of the superposition signal.

Aspect 6: The method of any of aspects 1 through 2, wherein receiving the first transmission comprises: decoding an enhanced layer of the superposition signal comprising the enhanced layer and a base layer, the base layer associated with the second transmission.

Aspect 7: The method of any of aspects 1 through 2, wherein receiving the first transmission comprises: decoding a base layer of the superposition signal comprising an enhanced layer and the base layer, the enhanced layer associated with the second transmission.

Aspect 8: The method of any of aspects 1 through 2, wherein receiving the first transmission comprises: decoding the superposition signal to obtain the first transmission from a base layer of the superposition signal based at least in part on the second transmission having the higher priority than the first transmission.

Aspect 9: The method of aspect 1, further comprising: receiving, in the superposition control information, an indication that the first transmission corresponds to a first transmission layer of the superposition signal and the second transmission corresponds to a second transmission layer of the superposition signal, the superposition control information indicating one or more parameters associated with the second transmission layer, wherein decoding the superposition signal comprises: decoding the superposition signal to obtain the first transmission from the first transmission layer of the superposition signal based at least in part on one or more parameters associated with the second transmission layer.

Aspect 10: The method of any of aspects 1 through 9, wherein the superposition control information indicates a time and frequency location of the superposition signal, a power parameter associated with the superposition signal, a modulation and coding scheme associated with the superposition signal, a channel identifier associated with the superposition signal, a demodulation reference signal identifier, or a combination thereof.

Aspect 11: The method of any of aspects 1 through 10, further comprising: transmitting, to a network entity, a capability message indicating a capability to decode an enhanced layer of the superposition signal, wherein receiving the superposition control information that indicates the superposition of the second transmission is based at least in part on the capability message.

Aspect 12: A method for wireless communications at a network entity, comprising: transmitting, to a first UE, control signaling scheduling a first transmission via a first set of resources; transmitting, to the first UE, a second UE, or both, superposition control information that indicates superposition of a second transmission and the first transmission during at least a portion of the first set of resources based at least on part on the second transmission having a higher priority than the first transmission; and transmitting, to the first UE, the second UE, or both, a superposition signal via a second set of resources that at least partially overlap with the first set of resources, the superposition signal comprising at least a portion of the first transmission and the second transmission.

Aspect 13: The method of aspect 12, wherein transmitting the superposition signal comprises: transmitting the second transmission via a base layer of the superposition signal; and transmitting the first transmission via an enhanced layer of the superposition signal.

Aspect 14: The method of aspect 12, wherein transmitting the superposition signal comprises: transmitting the second transmission via an enhanced layer of the superposition signal; and transmitting the first transmission via a base layer of the superposition signal.

Aspect 15: The method of any of aspects 12 through 14, wherein the superposition control information indicates a time and frequency location of the superposition signal, a base layer or an enhanced layer associated with first transmission, a power parameter associated with the superposition signal, a modulation and coding scheme associated with the superposition signal, a channel identifier associated with the superposition signal, a demodulation reference signal identifier associated with the superposition signal, or a combination thereof.

Aspect 16: The method of any of aspects 12 through 15, wherein transmitting the superposition signal comprises: transmitting the superposition signal in accordance with a first modulation and coding scheme for the first transmission and a second modulation and coding scheme for the second transmission.

Aspect 17: The method of aspect 16, further comprising: transmitting the superposition control information comprising an indication of the first modulation and coding scheme, the second modulation and coding scheme, or both.

Aspect 18: The method of any of aspects 12 through 17, wherein transmitting the superposition signal comprises: transmitting the superposition signal comprising the first transmission as one of a base layer or an enhanced layer based at least in part on one or more parameters associated with the first UE and the second transmission as one of the base layer or the enhanced layer based at least in part on one or more parameters associated with the second UE.

Aspect 19: The method of aspect 18, further comprising: transmitting the superposition control information that comprises an indication of the base layer and the enhanced layer.

Aspect 20: The method of any of aspects 18 through 19, wherein the one or more parameters comprise a priority level, a pathloss, a channel quality, a device capability, or any combination thereof.

Aspect 21: The method of aspect 12, further comprising: transmitting the superposition control information that comprises an indication that a first portion of the superposition signal is allocated for the first transmission and a second portion of the superposition signal is allocated for the second transmission.

Aspect 22: The method of aspect 21, further comprising: mapping the first transmission to a plurality of least significant bits of the superposition signal; and mapping the second transmission to a plurality of most significant bits of the superposition signal, wherein transmitting the superposition signal is based at least in part on the mapping.

Aspect 23: The method of aspects 21, further comprising: mapping the first transmission to a plurality of most significant bits of the superposition signal; and mapping the second transmission to a plurality of least significant bits of the superposition signal, wherein transmitting the superposition signal is based at least in part on the mapping.

Aspect 24: The method of aspects 12, wherein transmitting the superposition signal comprises: transmitting a first transmission layer of the superposition signal that comprises the first transmission via; and transmitting a second transmission layer of the superposition signal that comprises the second transmission.

Aspect 25: The method of aspect 24, further comprising: transmitting the superposition control information that comprises an indication that the first transmission corresponds to the first transmission layer and the second transmission corresponds to the second transmission layer, the superposition control information indicating one or more parameters associated with the first transmission layer, the second transmission layer, or both.

Aspect 26: The method of any of aspects 12 through 25, further comprising: receiving a capability message indicating a capability to decode an enhanced layer of the superposition signal, wherein transmitting the superposition signal is based at least in part on the capability message.

Aspect 27: An apparatus for wireless communication at a UE, comprising a processor; memory coupled with the processor; and instructions stored in the memory and executable by the processor to cause the apparatus to perform a method of any of aspects 1 through 11.

Aspect 28: An apparatus for wireless communication at a UE, comprising at least one means for performing a method of any of aspects 1 through 11.

Aspect 29: A non-transitory computer-readable medium storing code for wireless communication at a UE, the code comprising instructions executable by a processor to perform a method of any of aspects 1 through 11.

Aspect 30: An apparatus for wireless communications at a network entity, comprising a processor; memory coupled with the processor; and instructions stored in the memory and executable by the processor to cause the apparatus to perform a method of any of aspects 12 through 26.

Aspect 31: An apparatus for wireless communications at a network entity, comprising at least one means for performing a method of any of aspects 12 through 26.

Aspect 32: A non-transitory computer-readable medium storing code for wireless communications at a network entity, the code comprising instructions executable by a processor to perform a method of any of aspects 12 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- one or more processors;
- one or more memories coupled with the one or more processors; and
- instructions stored in the one or more memories and executable by the one or more processors to cause the apparatus to:
  - receive control signaling scheduling a first transmission via a first set of resources;
  - receive, after receiving the control signaling, superposition control information that indicates superposition of a second transmission and the first transmission during at least a portion of the first set of resources based at least on part on the second transmission having a higher priority than the first transmission, wherein the superposition control information indicates that the first transmission is transmitted via a first spatial layer corresponding to a first multiple input multiple output (MIMO) beam and that the second transmission is transmitted via a second spatial layer corresponding to a second MIMO beam;
  - monitor the first set of resources for the first transmission based at least in part on the control signaling;
  - decode a superposition signal comprising the first transmission and the second transmission to receive the first transmission via the first set of resources based at least in part on the superposition control information; and
  - receive, in second superposition control information, an indication of a superposition of a third transmission with a fourth transmission during at least a portion of a second set of resources allocated for the third transmission, wherein the third transmission is intended for the UE, and wherein the second superposition control information indicates that a first portion of a second superposition signal is allocated for the third transmission and a second portion of the second superposition signal is allocated for the fourth transmission, wherein receiving the second superposition signal is based at least in part on receiving the indication.

2. The apparatus of claim 1, wherein the first portion corresponds to a set of least significant bits of the second superposition signal and the second portion corresponds to a set of most significant bits of the second superposition signal.

3. The apparatus of claim 1, wherein the first portion corresponds to a set of most significant bits of the second superposition signal and the second portion corresponds to a set of least significant bits of the second superposition signal.

4. The apparatus of claim 1, wherein the superposition control information indicates one or more parameters associated with the second spatial layer, wherein decoding the superposition signal comprises:
- decode the superposition signal to obtain the first transmission from the first spatial layer of the superposition signal based at least in part on the one or more parameters associated with the second spatial layer.

5. The apparatus of claim 1, wherein the superposition control information indicates a time and frequency location of the superposition signal, a power parameter associated with the superposition signal, a modulation and coding scheme associated with the superposition signal, a channel identifier associated with the superposition signal, a demodulation reference signal identifier, or a combination thereof.

6. The apparatus of claim 1, wherein the instructions are further executable by the one or more processors to cause the apparatus to:

transmit, to a network entity, a capability message indicating a capability to decode the superposition signal, wherein receiving the superposition control information that indicates the superposition of the second transmission is based at least in part on the capability message.

7. An apparatus for wireless communications at a network entity, comprising:

one or more processors;

one or more memories coupled with the one or more processors; and instructions stored in the one or more memories and executable by the one or more processors to cause the apparatus to:

transmit, to a first user equipment (UE), control signaling scheduling a first transmission via a first set of resources;

transmit, to the first UE, a second UE, or both and after transmitting the control signaling, superposition control information that indicates superposition of a second transmission and the first transmission during at least a portion of the first set of resources based at least on part on the second transmission having a higher priority than the first transmission, wherein the superposition control information indicates that the first transmission is transmitted via a first spatial layer corresponding to a first multiple input multiple output (MIMO) beam and that the second transmission is transmitted via a second spatial layer corresponding to a second MIMO beam;

transmit, to the first UE, the second UE, or both, a superposition signal via a second set of resources that at least partially overlap with the first set of resources, the superposition signal comprising at least a portion of the first transmission and the second transmission; and transmit second superposition control information that indicates a superposition of a third transmission with a fourth transmission during at least a portion of a third set of resources allocated for the third transmission, wherein the third transmission is intended for the first UE and the second transmission is intended for the second UE, and wherein the second superposition control information comprises an indication that a first portion of a second superposition signal is allocated for the third transmission and a second portion of the second superposition signal is allocated for the fourth transmission.

8. The apparatus of claim 7, wherein the superposition control information indicates a time and frequency location of the superposition signal, a power parameter associated with the superposition signal, a modulation and coding scheme associated with the superposition signal, a channel identifier associated with the superposition signal, a demodulation reference signal identifier associated with the superposition signal, or a combination thereof.

9. The apparatus of claim 7, wherein the instructions to transmit the superposition signal are executable by the one or more processors to cause the apparatus to:

transmit the superposition signal in accordance with a first modulation and coding scheme for the first transmission and a second modulation and coding scheme for the second transmission.

10. The apparatus of claim 9, wherein the instructions are further executable by the one or more processors to cause the apparatus to:

transmit the superposition control information comprising an indication of the first modulation and coding scheme, the second modulation and coding scheme, or both.

11. The apparatus of claim 7, wherein the instructions are further executable by the one or more processors to cause the apparatus to:

map the third transmission to a plurality of least significant bits of the second superposition signal and the fourth transmission to a plurality of most significant bits of the second superposition signal, wherein transmitting the second superposition signal is based at least in part on the mapping.

12. The apparatus of claim 7, wherein the instructions are further executable by the one or more processors to cause the apparatus to:

map the third transmission to a plurality of most significant bits of the second superposition signal and the fourth transmission to a plurality of least significant bits of the second superposition signal, wherein transmitting the second superposition signal is based at least in part on the mapping.

13. The apparatus of claim 7, wherein the instructions to transmit the superposition signal are executable by the one or more processors to cause the apparatus to:

transmit the first spatial layer of the superposition signal that comprises the first transmission; and transmit the second spatial layer of the superposition signal that comprises the second transmission.

14. The apparatus of claim 13, wherein the superposition control information indicates one or more parameters associated with the first spatial layer, the second spatial layer, or both.

15. The apparatus of claim 7, wherein the instructions are further executable by the one or more processors to cause the apparatus to:

receive a capability message indicating a capability to decode the superposition signal, wherein transmitting the superposition signal is based at least in part on the capability message.

16. A method for wireless communication at a user equipment (UE), comprising:

receiving control signaling scheduling a first transmission via a first set of resources;

receiving, after receiving the control signaling, superposition control information that indicates superposition of a second transmission and the first transmission during at least a portion of the first set of resources based at least on part on the second transmission having a higher priority than the first transmission, wherein the superposition control information indicates that the first transmission is transmitted via a first spatial layer corresponding to a first multiple input multiple output (MIMO) beam and that the second transmission is transmitted via a second spatial layer corresponding to a second MIMO beam;

monitoring the first set of resources for the first transmission based at least in part on the control signaling;

decoding a superposition signal comprising the first transmission and the second transmission to receive the first transmission via the first set of resources based at least in part on the superposition control information; and receiving, in second superposition control information, an indication of a superposition of a third transmission with a fourth transmission during at least a portion of a second set of resources allocated for the third transmission, wherein the third transmission is intended for the UE, and wherein the second superposition control information indicates whether the third transmission is to be transmitted via an enhanced layer of a second superposition signal or a base layer of the second superposition signal, wherein receiving the second superposition signal is based at least in part on the indication.

17. The method of claim 16, wherein the superposition control information indicates one or more parameters associated with the second spatial layer, wherein decoding the superposition signal comprises:

decoding the superposition signal to obtain the first transmission from the first spatial layer of the superposition signal based at least in part on the one or more parameters associated with the second spatial layer.

18. The method of claim 16, wherein the superposition control information indicates a time and frequency location of the superposition signal, a power parameter associated with the superposition signal, a modulation and coding scheme associated with the superposition signal, a channel identifier associated with the superposition signal, a demodulation reference signal identifier, or a combination thereof.

19. The method of claim 16, further comprising:

transmitting, to a network entity, a capability message indicating a capability to decode the superposition signal, wherein receiving the superposition control information that indicates the superposition of the second transmission is based at least in part on the capability message.

20. A method for wireless communications at a network entity, comprising:

transmitting, to a first user equipment (UE), control signaling scheduling a first transmission via a first set of resources;

transmitting, to the first UE, a second UE, or both and after transmitting the control signaling, superposition control information that indicates superposition of a second transmission and the first transmission during at least a portion of the first set of resources based at least on part on the second transmission having a higher priority than the first transmission, wherein the superposition control information indicates that the first transmission is transmitted via a first spatial layer corresponding to a first multiple input multiple output (MIMO) beam and that the second transmission is transmitted via a second spatial layer corresponding to a second MIMO beam;

transmitting, to the first UE, the second UE, or both, a superposition signal via a second set of resources that at least partially overlap with the first set of resources, the superposition signal comprising at least a portion of the first transmission and the second transmission;

transmitting second superposition control information that indicates a superposition of a third transmission with a fourth transmission during at least a portion of a third set of resources allocated for the third transmission, wherein the third transmission is intended for the first UE and the second transmission is intended for the second UE; and transmitting a second superposition signal comprising the third transmission as one of a base layer or an enhanced layer based at least in part on one or more parameters associated with the first UE and the fourth transmission as one of the base layer or the enhanced layer based at least in part on one or more parameters associated with the second UE.

21. The method of claim 20, further comprising:

transmitting the second superposition control information that comprises an indication of the base layer and the enhanced layer.

22. The method of claim 20, wherein the one or more parameters comprise a priority level, a pathloss, a channel quality, a device capability, or any combination thereof.

23. The method of claim 20, wherein the superposition control information indicates a time and frequency location of the superposition signal, a power parameter associated with the superposition signal, a modulation and coding scheme associated with the superposition signal, a channel identifier associated with the superposition signal, a demodulation reference signal identifier associated with the superposition signal, or a combination thereof.

24. The method of claim 20, further comprising:

transmitting the superposition signal in accordance with a first modulation and coding scheme for the first transmission and a second modulation and coding scheme for the second transmission.

25. The method of claim 24, further comprising:

transmitting the superposition control information comprising an indication of the first modulation and coding scheme, the second modulation and coding scheme, or both.

* * * * *